(12) United States Patent
Bryant et al.

(10) Patent No.: US 11,893,636 B1
(45) Date of Patent: Feb. 6, 2024

(54) MULTICHANNEL MASTER FEEDER EXCHANGE MECHANISM APPARATUSES, METHODS AND SYSTEMS

(71) Applicant: FMR, LLC, Boston, MA (US)

(72) Inventors: Marc R Bryant, Hingham, MA (US); Gregory A Friedman, Greenwood Village, CO (US); Scott Kirk O'Reilly, Charlestown, MA (US); Ralph Joseph Wolf, Lunenburg, MA (US)

(73) Assignee: FMR LLC, Boston, MA (US)

( * ) Notice: Subject to any disclaimer, the term of this patent is extended or adjusted under 35 U.S.C. 154(b) by 261 days.

(21) Appl. No.: 14/495,765

(22) Filed: Sep. 24, 2014

Related U.S. Application Data

(63) Continuation-in-part of application No. 13/741,559, filed on Jan. 15, 2013, now abandoned.
(Continued)

(51) Int. Cl.
*G06Q 40/08* (2012.01)
*G06Q 10/04* (2023.01)
(Continued)

(52) U.S. Cl.
CPC ........... *G06Q 10/04* (2013.01); *H04L 51/046* (2013.01); *H04L 63/168* (2013.01); *H04L 67/10* (2013.01)

(58) Field of Classification Search
CPC ..... G06Q 40/00; G06Q 40/02; G06Q 40/04–6
See application file for complete search history.

(56) References Cited

U.S. PATENT DOCUMENTS 6,938,009 B1 * 8/2005 Herbst ................... G06Q 40/00
705/30
7,305,362 B2  12/2007 Weber et al.
(Continued)

FOREIGN PATENT DOCUMENTS

WO  WO-2006108062 A2 * 10/2006 ............. G06Q 30/02
WO  WO-2013003750 A1 *  1/2013 ............. G06Q 40/04

OTHER PUBLICATIONS

Semi-Annual Report Dec. 31, 2018, SSGA Active Trust SPDR Blackstone / GSO Senior Loan ETF.*
(Continued)

*Primary Examiner* — Richard C Weisberger
(74) *Attorney, Agent, or Firm* — Hanchuk Kheit LLP.; Walter G. Hanchuk

(57) ABSTRACT

The Multichannel Master Feeder Exchange Mechanism Apparatuses, Methods and Systems ("MMFEM") transforms user share purchase, redemption request inputs via MMFEM components into fund share transaction records outputs. A processor-implemented non-transparent, master-feeder, master-feeder investment vehicle management, multichannel datastructure apparatus, comprising a processor and memory. The MMFEM memory having instructions to instantiate a multichannel asset vehicle configuration datapath and create a the multichannel vehicle data structure. The MMFEM may then determine a plurality of investment share data structures for the multichannel asset vehicle data structure and facilitate a transaction of investment shares data structures of the multichannel investment vehicle data structure based on the determined share price, wherein a master fund establishes a data feed for feeder funds to track.

18 Claims, 15 Drawing Sheets

Related U.S. Application Data

(60) Provisional application No. 62/054,854, filed on Sep. 24, 2014, provisional application No. 62/024,439, filed on Jul. 14, 2014, provisional application No. 61/946,563, filed on Feb. 28, 2014, provisional application No. 61/906,396, filed on Nov. 19, 2013, provisional application No. 61/906,395, filed on Nov. 19, 2013, provisional application No. 61/881,927, filed on Sep. 24, 2013.

(51) Int. Cl.
*H04L 51/046* (2022.01)
*H04L 67/10* (2022.01)
*H04L 9/40* (2022.01)

(56) References Cited

U.S. PATENT DOCUMENTS

| | | | |
|---|---|---|---|
| 7,496,531 B1* | 2/2009 | Gastineau | G06Q 40/00 705/37 |
| 7,526,445 B2 | 4/2009 | MacQueen et al. | |
| 7,571,130 B2 | 8/2009 | Weber et al. | |
| 7,574,399 B2 | 8/2009 | Weber et al. | |
| 7,822,678 B2 | 10/2010 | Weber et al. | |
| 7,865,426 B2* | 1/2011 | Volpert | G06Q 40/06 705/37 |
| 7,895,118 B2* | 2/2011 | Glodjo | G06Q 20/10 705/37 |
| 7,917,429 B2 | 3/2011 | Weber et al. | |
| 7,979,336 B2 | 7/2011 | Weber et al. | |
| 8,027,911 B2 | 9/2011 | Weber et al. | |
| 8,170,934 B2 | 5/2012 | Weber et al. | |
| 8,335,734 B1* | 12/2012 | Sauter | G06Q 40/04 705/37 |
| 8,452,682 B1 | 5/2013 | Gastineau | |
| 8,533,118 B2* | 9/2013 | Weller | G06F 21/31 705/35 |
| 8,589,269 B1 | 11/2013 | Bendel | |
| 8,788,403 B1 | 7/2014 | Seale et al. | |
| 8,793,179 B1 | 7/2014 | Berry et al. | |
| 10,102,573 B1* | 10/2018 | Faust, Jr. | G06Q 40/04 |
| 2002/0046154 A1 | 4/2002 | Pritchard | |
| 2003/0177077 A1 | 9/2003 | Norman | |
| 2004/0186803 A1 | 9/2004 | Weber | |
| 2005/0119962 A1 | 6/2005 | Bowen et al. | |
| 2005/0192889 A1* | 9/2005 | Sauter | G06Q 20/042 705/37 |
| 2008/0040258 A1 | 2/2008 | Weber | |
| 2008/0091585 A1 | 4/2008 | MacQueen | |
| 2008/0177676 A1 | 7/2008 | Weber et al. | |
| 2008/0313100 A1 | 12/2008 | Weber | |
| 2009/0313178 A1 | 12/2009 | Weber et al. | |
| 2010/0023436 A1 | 1/2010 | Weild, IV | |
| 2011/0029455 A1 | 2/2011 | Weber et al. | |
| 2011/0137825 A1 | 6/2011 | Weber et al. | |
| 2012/0254010 A1 | 10/2012 | Weber | |
| 2013/0006890 A1* | 1/2013 | Faust, Jr. | G06Q 40/06 705/36 R |
| 2014/0207648 A1 | 7/2014 | Wallman | |
| 2014/0279338 A1 | 9/2014 | Mehta | |
| 2014/0279351 A1 | 9/2014 | Christiansen et al. | |
| 2014/0279702 A1 | 9/2014 | Douillet | |
| 2014/0304135 A1 | 10/2014 | Decket et al. | |
| 2014/0304139 A1 | 10/2014 | Shacknofsky | |
| 2015/0310555 A1 | 10/2015 | Weber | |
| 2015/0348195 A1 | 12/2015 | Weber | |
| 2019/0066212 A1 | 2/2019 | Roberts et al. | |

OTHER PUBLICATIONS

A look at side-by-side management: evidence from ETFs and mutual funds Herminio Romero-Pe' Rez* and Javier Rodri'Guez 2011.*

The Exchange-Traded Funds Manual Author: Gastineau, Gary L Publication info: Second edition. Wiley Finance series. Hoboken, N.J.: Wiley, (Abstract Index Only) (Year: 2010).*

The History of the Stock Market.*

Structures for Using an Existing Mutual Fund to Launch an Exchange-Traded 2012.*

* cited by examiner

MMFEM—Non-Transparent Closed-End Fund Workflow

MMFEM—Proxy Basket Tracking Workflow

MMFEM—Closed-End Fund Management Datagraph

MMFEM—Managing an Actively Traded Fund Component Logic flow

MMFEM—Basket Tracking Structure Component Processing Flow

MMFEM—Master Feeder Datagraph

MMFEM -- Master Feeder Component Logic Flow

MMFEM -- Master Feeder Datagraph

MMFEM—Master Feeder Component Logic Flow

MULTICHANNEL MASTER FEEDER EXCHANGE MECHANISM APPARATUSES, METHODS AND SYSTEMS

PRIORITY CLAIM

Applicant hereby claims benefit to priority under 35 USC § 120 as a continuation-in part of: U.S. application Ser. No. 13/741,559 filed Jan. 15, 2013 entitled "Master Feeder Structure for Pooled Investment Companies."

Applicant also hereby claims benefit to priority under 35 USC § 119 as a non-provisional conversion of: U.S. provisional application Ser. No. 62/054,854, filed Sep. 24, 2014, entitled "Multichannel Master Feeder Exchange Mechanism Apparatuses, Methods and Systems,"; US provisional patent application Ser. No. 62/024,439, filed Jul. 14, 2014, entitled "Multichannel Master Feeder Exchange Mechanism Apparatuses, Methods and Systems,"; U.S. provisional patent application Ser. No. 61/946,563, filed Feb. 28, 2014, entitled "Closed-End Exchange-Traded Fund Management Apparatuses, Methods and Systems,"; US provisional application Ser. No. 61/906,395, filed Nov. 19, 2013, entitled "Closed-End Exchange-Traded Fund Management Apparatuses, Methods and Systems,"; U.S. provisional application Ser. No. 61/906,396, filed Nov. 19, 2013, entitled "Closed-End Exchange-Traded Fund Management Apparatuses, Methods and Systems,"; US provisional application Ser. No. 61/881,927, filed Sep. 24, 2013, entitled "Proxy Basket Tracking Apparatuses, Methods and Systems,".

The entire contents of the aforementioned applications within this Priority Claim section are herein expressly incorporated by reference.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address data structures and information management asset management, and more particularly, include Multichannel Master Feeder Exchange Mechanism Apparatuses, Methods and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

An exchange-traded fund (ETF) is an investment fund traded on exchanges, such as the New York Stock Exchange (NYSE) and NASDAQ. An ETF holds financial assets such as stocks, commodities, or bonds, and trades close to its net asset value (NAV) over the course of the trading day. A market participant receives public information about an ETF and invests in the ETF by buying shares of the ETF.

BRIEF DESCRIPTION OF THE DRAWINGS

Appendices and/or drawings illustrating various, non-limiting, example, innovative aspects of the Multichannel Master Feeder Exchange Mechanism Apparatuses, Methods and Systems (hereinafter "MMFEM") disclosure, include.

Figure 1A:
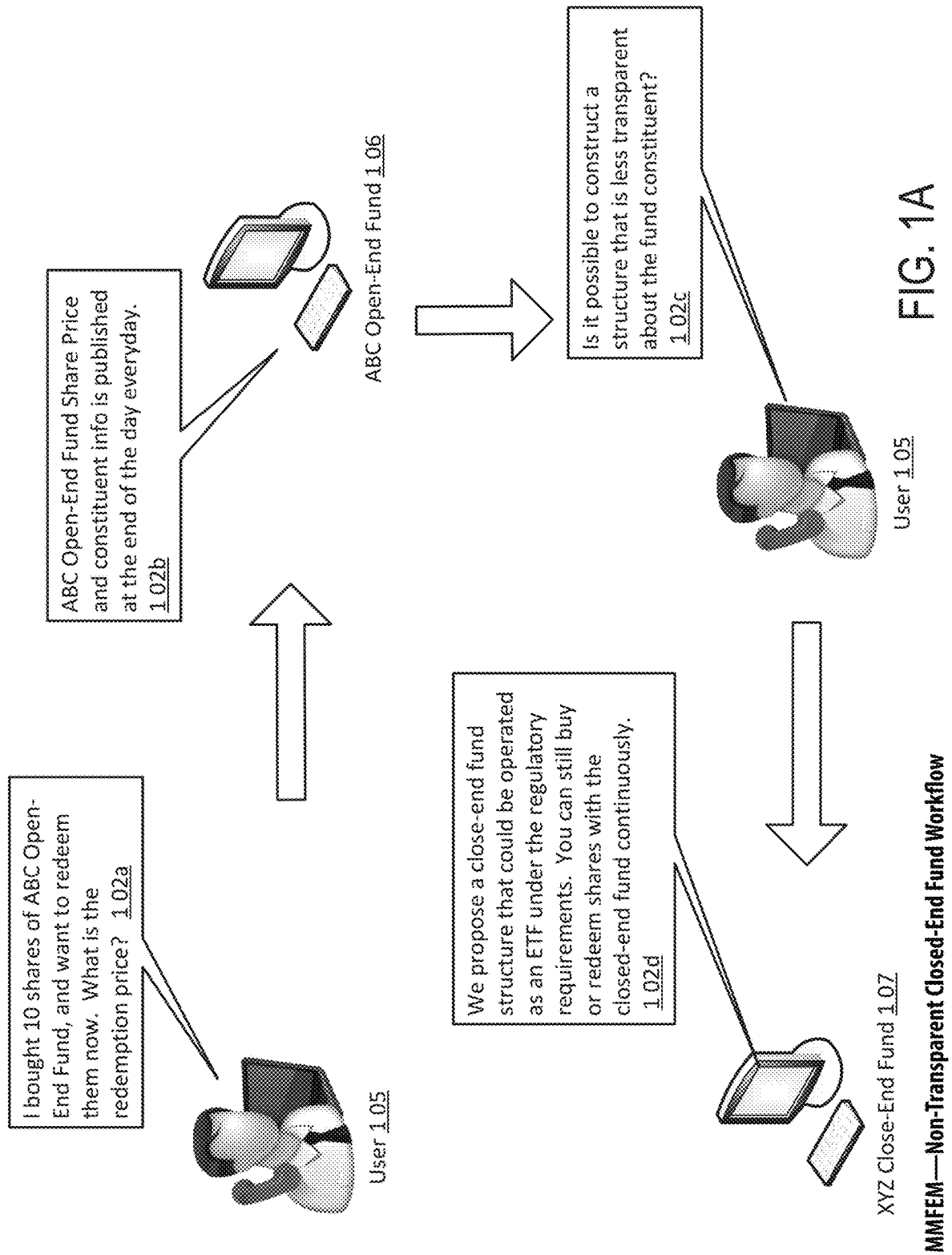
FIG. 1A provides an exemplary diagram illustrating aspects of a non-transparent closed-end exchange-traded fund structure within embodiments of the MMFEM.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citation and/or reference numbers are not necessarily sequences but rather just example orders that may be rearranged and other orders are contemplated.

DETAILED DESCRIPTION

The Multichannel Master Feeder Exchange Mechanism Apparatuses, Methods and Systems (hereinafter "MMFEM") transforms user share purchase, redemption request inputs, via MMFEM components (e.g., Basket Creation, Basket Redemption, Share issuance, NAV Calculation, Share Calculation, Order Execution, CTF Structure Initiation, Pricing Discovery, Tighten Spread, Master-Feeder, etc., etc.), into fund share transaction records outputs. The MMFEM components, in various embodiments, implement advantageous features as set forth below.

Introduction

In one non-limiting embodiment, the MMFEM may combine assets from various channels into a single pool. As such, it may avoid data obstacles, transfer and legal inefficiencies and issues associated and burdening existing share class ETFs (e.g., such as Vanguard's), while providing better outcomes. In one embodiment, the MMFEM may incorporate closed-end exchange-traded fund management components (hereinafter "CTF") and proxy basket tracking components (hereinafter "PBT").

MMFEM provides an exchange traded fund structure management that operates and manages closed-end investment companies as exchange-traded funds. In some implementations, an exchange traded fund may be administered as a closed-end investment company that offers (e.g., a single class of) its shares at net asset value (NAV) to select institutional purchasers on a daily basis (creations), offers to repurchase its shares at NAV from select institutional sellers (redemptions), and lists its shares for trading on a securities exchange, which are bought and sold at negotiated market prices. In one implementation, such closed-end investment companies may issue shares in an initial public offering and may not continuously offer or redeem shares at NAV (e.g., instead, shares trade on the secondary market at market prices). In another implementation, the CTF may create a closed-end investment company and operate it as an "open-ended" exchange-traded fund, e.g., the closed-end investment company may issue shares in an initial public offering and make ongoing offerings periodically (e.g., daily, weekly, bi-weekly, monthly, quarterly, etc.); such a closed-end investment company may also offer to redeem shares at its NAV periodically. In one implementation, such closed-end investment companies may not need to disclose its holdings in compliance with the Securities and Exchange Commission (SEC).

In one implementation, the CTF may provide a closed-end investment vehicle, combining elements of mutual funds and closed-end funds. In one implementation, capital may not flow into or out of the closed end funds when shareholders buy or sell shares; and shares purchased through the initial public offering may be traded on the open market. In another implementation, capital may flow into or out of the closed-end investment vehicle, as certain shareholders may be continuously, intermittently and/or periodically buy or sell shares from or to the closed-end investment vehicle.

In one implementation, as the closed-end investment vehicle may be operated as an "open-ended" exchange-traded fund, e.g., by allowing continuous offering of shares from the vehicle and/or redemption of shares with a shareholder, the share price of the closed-end investment vehicle may be different from its net asset value, resulting in premium or discount.

In one embodiment, the MMFEM may provide an exchange traded fund structure management that operates and manages closed-end investment companies as exchange-traded funds by creating a closed-end investment company and operating it as an exchange-traded fund in compliance with regulatory requirement, e.g., the closed-end investment company may issue shares in an initial public offering and ongoing offerings periodically (e.g., daily, weekly, bi-weekly, monthly, quarterly, etc.); such closed-end investment company may also offer to redeem shares at its market price periodically.

MMFEM

FIG. 1A provides an exemplary diagram illustrating aspects of a non-transparent closed-end exchange-traded fund structure within embodiments of the MMFEM. Within implementations, when a user 105 may purchase or redeem shares with an open-end fund 106, e.g., at 102a, the open-end fund 106 may facilitate such purchase and/or redemption by continuously offering new shares or buying back shares, and publishing the open-end fund's most up-to-date holdings and/or constituents at the end of each trading day.

In one implementation, today, exchange traded funds may be most often organized as open-end investment companies under the Investment Company Act of 1940, which means that they continuously offer and redeem shares at net asset value as of the close of the market. In one implementation, market participants, e.g., a user 105 may desire a fund that is less transparent 102c. In one implementation, unlike open-end investment companies, MMFEM may facilitate closed-end investment companies 107 to be operated as an exchange-traded fund, e.g., the closed-end investment company 107 may still be able to issue shares continuously via initial public offering and subsequent offerings, and to redeem shares from a shareholder 105, e.g., 102d. For example, the MMFEM may register such closed-end investment company 107 with the SEC as a closed-end fund under regulatory requirements, but operate the registered closed-end investment company as an ETF.

Figure 1B:
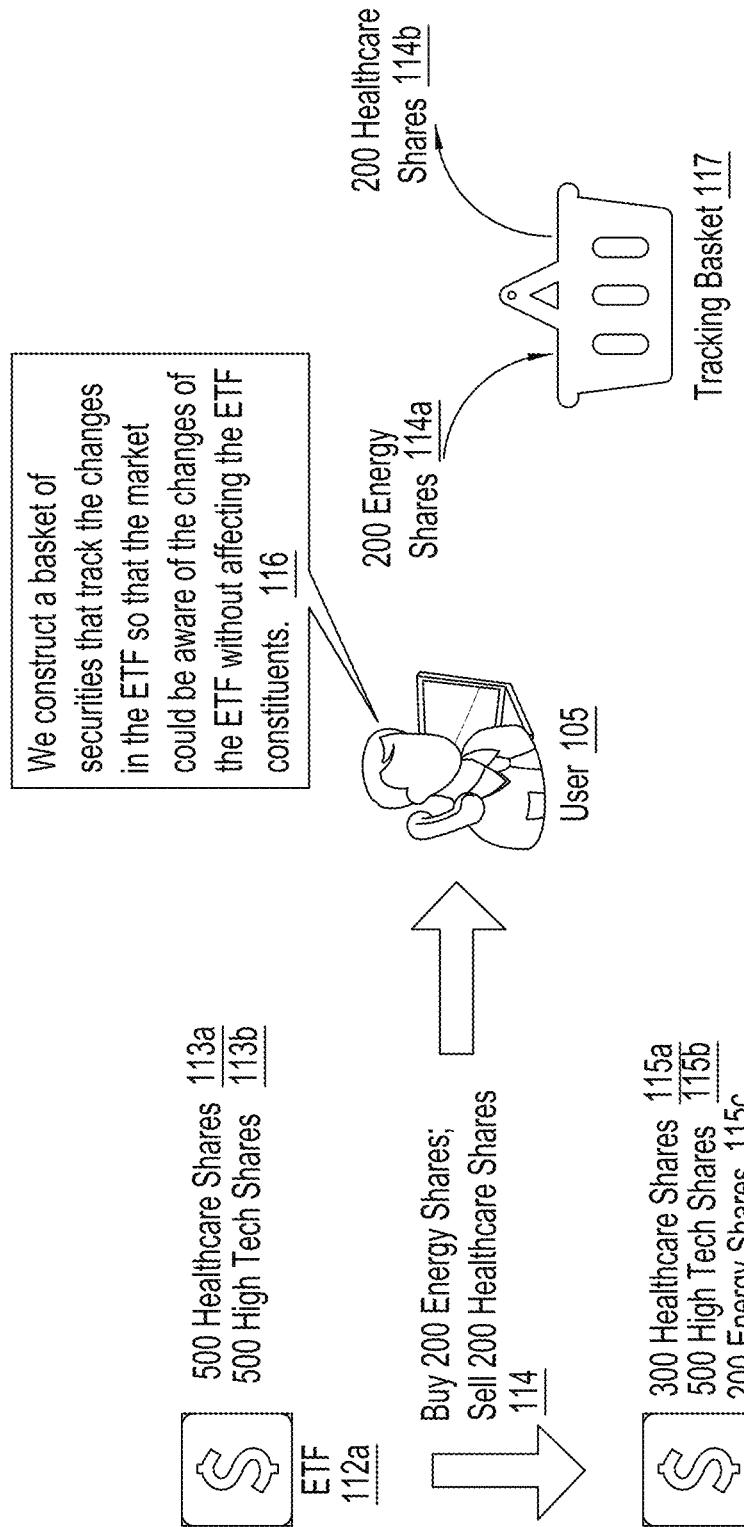
FIG. 1B provides an exemplary diagram illustrating aspects of basket tracking of a closed-end exchange traded-fund within embodiments of the MMFEM.

FIG. 1B provides an exemplary diagram illustrating aspects of basket tracking of a closed-end exchange traded-fund within embodiments of the MMFEM. In one implementation, Exchange-traded funds, e.g., 112a-b, or ETFs, may comprise investment companies that are legally classified as open-end companies or Unit Investment Trusts (UITs), but that differ from traditional open-end companies and UITs. For example, ETFs may not sell individual shares directly to investors and only issue their shares in large blocks (blocks of 50,000 shares, for example) that are known as "Creation Units." Investors generally may not purchase Creation Units with cash. Instead, they buy Creation Units with a basket of securities (e.g., 117). Those who purchase Creation Units are frequently institutions. Such fund structure may permit other investors to purchase individual shares (instead of Creation Units). Investors who want to sell their ETF shares have two options: (1) they can sell individual shares to other investors on the secondary market, or (2) they can sell the Creation Units back to the ETF. In addition, ETFs may generally redeem Creation Units by giving investors the securities that comprise the portfolio instead of cash. So, for example, an ETF invested in the stocks contained in the Dow Jones Industrial Average (DJIA) would give a redeeming shareholder the actual securities that constitute the DJIA instead of cash. Because of the limited redeemability of ETF shares, ETFs are not considered to be-and may not call themselves-mutual funds.

In one implementation, MMFEM may establish a proxy instrument that facilitates managing public information about an actively managed fund, and tracking trading information of various financial instruments. For example, the proxy instrument may take a form as a tracking basket 117, that tracks trading information of various financial instruments. In one embodiment, the MMFEM may facilitate creation of the portfolio that may have confidentiality issues and require non-disclosure of its constituent makeup and changes. In one implementation, when the portfolio is subject to any changes due to trades executed on its constituents, e.g., whether the portfolio is and/or comprises an ETF, a mutual fund, and/or the like, there may be a delta that reflects changes from its previous state 112a as compared to its current state 112b. Such delta may occur on a daily, weekly, monthly, yearly, random, etc. basis. In one implementation, the MMFEM may analyze the delta to select an ETF to act as a proxy for that delta.

For example, when healthcare related equities 113a in an ETF 112a which originally held healthcare related equities 113a and high tech related equities 113b, were removed and replaced with energy related equities 114, equivalent energy equities 114a may become a constituent member of the proxy fund (e.g., the tracking basket 117) instead of the removed healthcare related equities 114b. Such a proxy mechanism may have the benefit that allows the market to be aware when a delta has occurred, and for the funds to be tracked, without knowing the exact underlying constituent securities being affected, e.g., 116; this may prevent various market destabilizing gaming purchases made by market players. Alternatively, instead of a single ETF to be used to track the delta, multiple ETFs may be synthesized; in a further implementation, one or more ETFs may be combined with other securities, notes, debts instruments, and/or the like, any combination of which may be synthesized to act as a proxy for the delta.

In another implementation, the MMFEM may create a basket 117 (e.g., a medium of exchange, etc.) for an ETF to transact with its underlying mutual fund by transferring a medium exchange to the mutual fund, and receiving shares of the mutual fund in return. In one implementation, the MMFEM may facilitate an authorized participant who desires to buy or redeem shares of the medium of exchange. In one implementation, MMFEM may track the trading information via the created basket, e.g., a combination of ETF and holding directions of the portfolio, etc. In one implementation, the basket may include ETFs, stocks, index, future/forward contracts, options, notes, and/or a combination of various financial instruments and derivatives, and/or the like.

For example, if a market participant may indicate a purchase on the market, the market participant may make a purchase of a portfolio of the indicated financial instruments (e.g., stock shares, future/forward contracts, swaps, options, etc.). In one implementation, the MMFEM may use the ETF to track a master portfolio, wherein the market price may be reflected in the new data feeds published by the ETF. Upon obtaining such information, the market participant may hedge the risk of the portfolio and redeem the purchased financial instruments with the ETF.

The proxy basket facilities of the MMFEM have a number of example advantages in that it arms the market makers with enough information about portfolios so as to avoid surprises and assists with their ability to arbitrage. And yet, it balances this with asset managers needs to protect existing shareholders by not revealing proprietary research through disclosure of real-time holdings.

Figure 2:
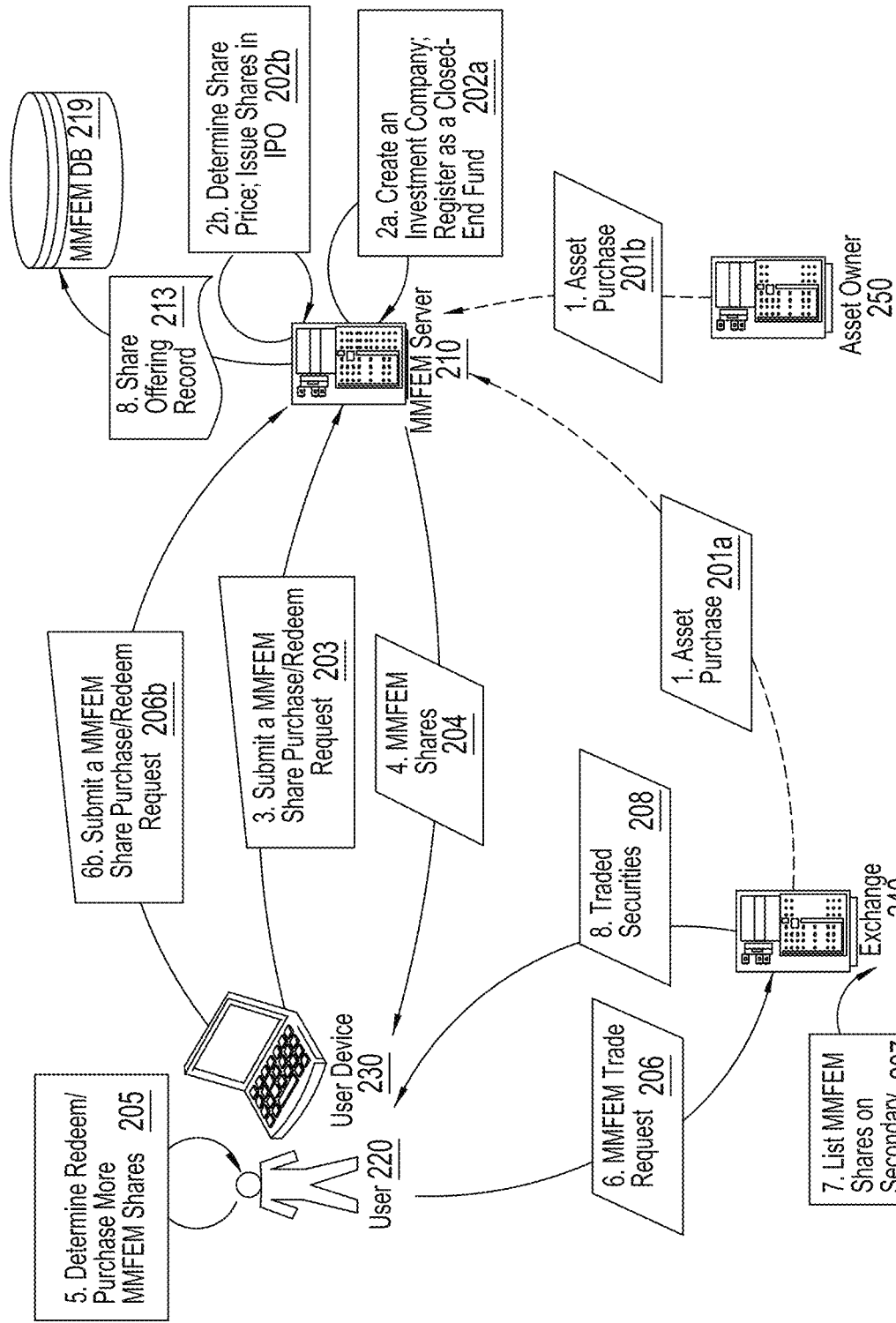
FIG. 2 provides an exemplary datagraph illustrating data flows between the MMFEMserver and various affiliated entities for managing a closed-end exchange-traded fund within embodiments of the MMFEM.

FIG. 2 provides an exemplary datagraph illustrating data flows between the MMFEM server and various affiliated entities for managing a closed-end exchange-traded fund within embodiments of the MMFEM. Within various embodiments, a user (e.g., a market participant, etc.) 220 operating a user device 230 (e.g., a Smartphone, a cellular phone, a laptop computer, a personal digital assistant, a desktop computer, a workstation, etc.), a MMFEM server 210, an asset owner 250, an exchange (e.g., a public exchange, etc.) 240, a MMFEM database(s) 219, and/or the like, may interact via a communication network for managing a closed-end exchange-traded fund and facilitating trading transactions within embodiments of the MMFEM.

Within implementations, the MMFEM server may instantiate an investment structure, organized under the regulations of the Investment Company Act of 1940. For example, such investment structure may comprise a type of investment company whose shares are traded on the open market, like a stock or an ETF. In one implementation, like a traditional mutual fund, the MMFEM fund may invest in a portfolio of securities.

In one implementation, the MMFEM may purchase assets 201a-b from (e.g., securities, bonds, ETFs, etc.) from the markets, e.g., from asset owners 250 via an initial public offering, or a secondary market such as an exchange 240. In one implementation, the MMFEM server 210 may create an investment company and register, e.g., with SEC, as a closed-end fund 202a; and the MMFEM server 210 may determine share price and initiated an IPO to issue shares 202 (e.g., see FIG. 3B, etc.).

In one implementation, the MMFEM server 210 may offer shares to a user (e.g., an authorized participant 220, etc.), e.g., the user 220 may submit a MMFEM share purchase request 203 to the MMFEM server 210. For example, in one implementation, the user 220 may operate the user device 230 to generate a (Secure) Hypertext Transfer Protocol ("HTTP(S)") message including a MMFEM share purchase request 203 in the form of data formatted according to the eXtensible Markup Language (XML). An example listing of a MMFEM share purchase request 203, substantially in the form of a HTTP(S) message including XML-formatted data, is provided below:

```
POST/purchase_request.php HTTP/1.1
Host: 192.168.23.126
Content-Type: Application/XML
Content-Length: 867
<?XML version="1.0" encoding="UTF-8"?>
<purchase_request>
   <session_id>HUUUSDWE</session_id>
   <timestamp>2014-02-22 15:22:43</timestamp>
   <user_id>JS001</user_id>
   <client_details>
      <client_IP>192.168.23.126</client_IP>
      <client_type>smartphone</client_type>
      <client_model>HTC Hero</client_model>
      <device_id>HTC_JS_001</device_id>
      . . .
   <client_details>
   . . .
   <number>50</number>
   <fund_id>TF4453</fund_id>
   <account_id>inv_09</account_id>
   <account_type>investment</account_type>
<purchase_request>
```

In one implementation, upon receiving a purchase request, the MMFEM may provide MMFEM shares 204 to the user, which may in turn determine whether a redemption and/or continuous purchase of the MMFEM shares is required 205 (e.g., for investment portfolio adjustment purposes). In one implementation, the user 220 may trade the MMFEM shares on a secondary market, e.g., by sending a MMFEM trade request 206 to the public exchange 240. An example listing of MMFEM trade request 206, substantially in the form of a HTTP(S) message including XML-formatted data, is provided below:

```
POST/trade_request.php HTTP/1.1
Host: 192.168.23.126
Content-Type: Application/XML
Content-Length: 867
<?XML version="1.0" encoding="UTF-8"?>
<trade_request>
   <session_id>HUUUS&*(DFD</session_id>
   <timestamp>2014-02-25 15:22:43</timestamp>
   <user_id>JS001</user_id>
   <client_details>
      <client_IP>192.168.23.126</client_IP>
      <client_type>smartphone</client_type>
      <client_model>HTC Hero</client_model>
```

```
    <device_id>HTC_JS_001</device_id>
    ...
    <client_details>
    ...
    <exchange_id>NYSE</exchange_id>
    <exchange_name>NYSE</exchange_name>
    <ask>
       <type>ETF</type>
       <position>short</position>
       <number>30</number>
       <fund_id>TF4453</fund_id>
       <price>
          <min>500.00</min>
          <max>515.00</515>
       </price>
       <securities_type>healthcare</securities_type>
       ...
    </ask>
    ...
    <trade_request>
```

In one implementation, the exchange 240 may list the MMFEM shares on the secondary market 207 and facilitate an order execution via the ask-bid process. In one implementation, the user may obtain traded securities 208 from the exchange 240, e.g., the user may trade the MMFEM shares with desired securities such as technology, healthcare, energy, utility, and/or the like.

Figure 3A:
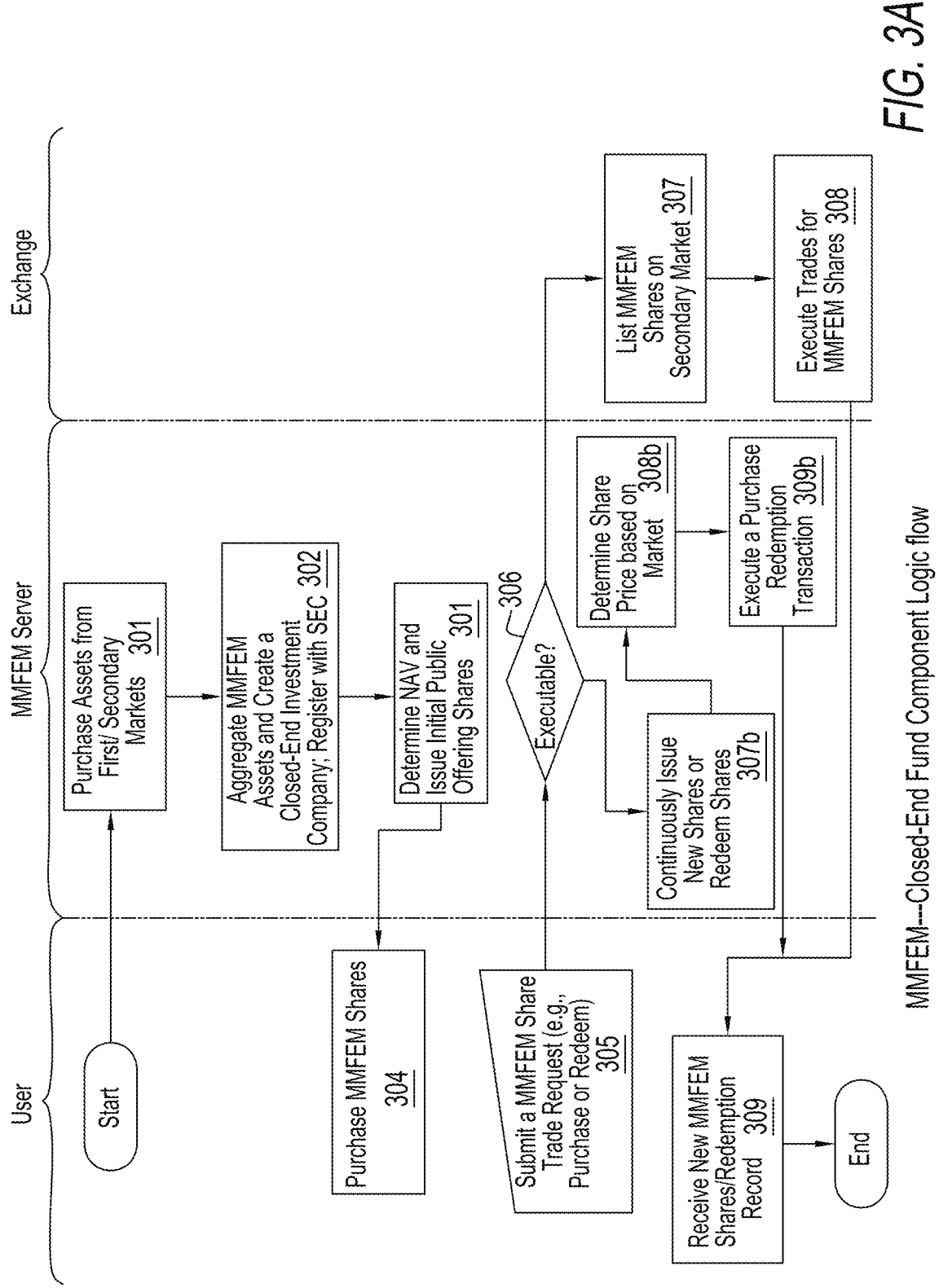
FIG. 3A-3B provide exemplary logic flow diagrams illustrating logic flows for managing a closed-end exchange-traded fund within embodiments of the MMFEM, and FIG. 3C provides exemplary creation/redemption process embodiments of the MMFEM.
Figure 3B:
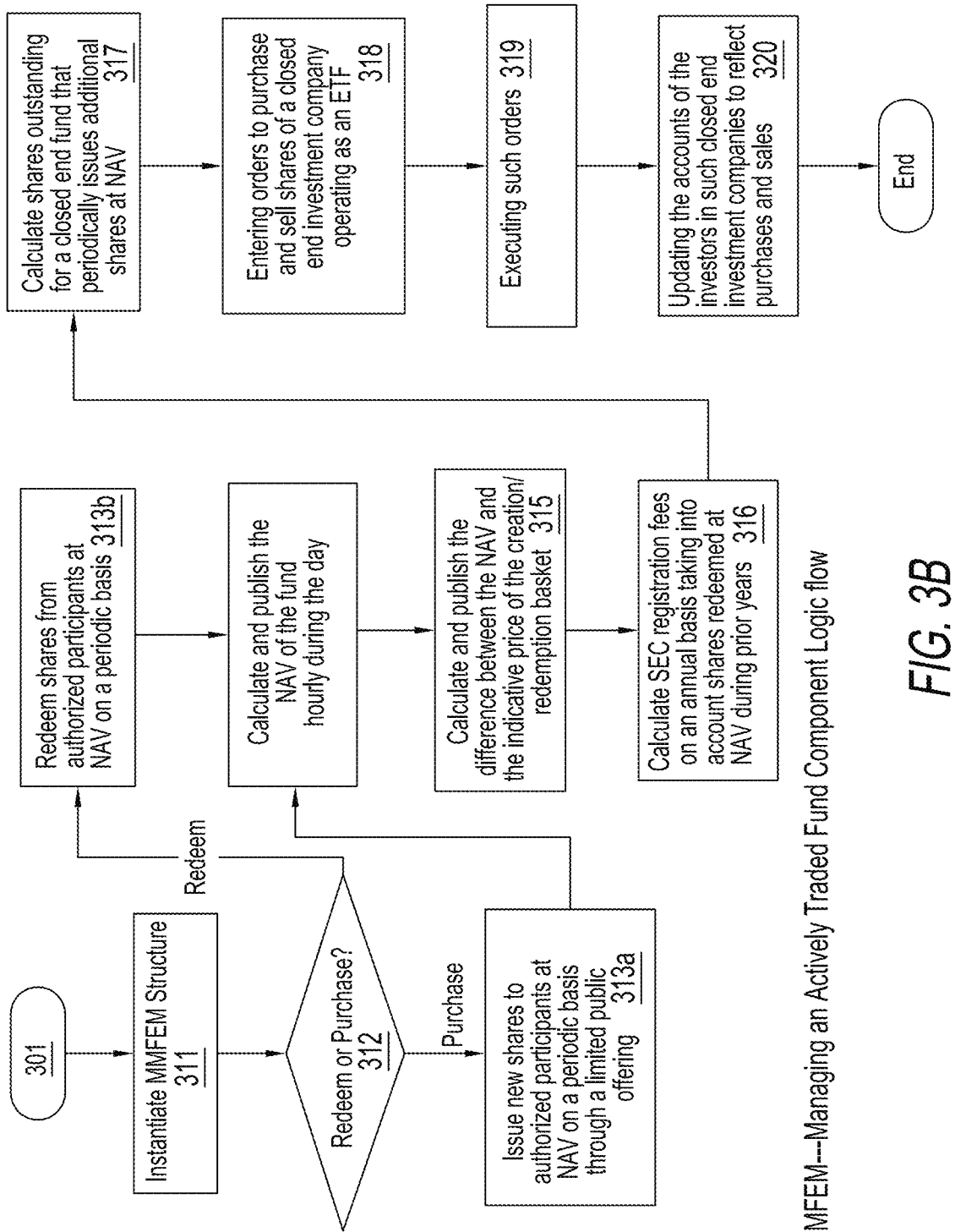

In another implementation, as further discussed in FIGS. 3A-3B, the closed-end MMFEM fund may continuously issue new shares for the user's purchase, or redeem the shares. For example, the user/user device may submit a MMFEM share purchase and/or redeem request 206b (which may take a data structure similar to that of 203) to the MMFEM server 210, which may continue to issue new shares for the user to purchase, and/or redeem the user's shares. In one implementation, the MMFEM server 210 may generate a share offering record 213 for storage in the MMFEM database. For example, the share offering may be provided on a periodic basis, one-time only, and/or the like. An exemplary listing, written substantially in the form of PHP/SQL commands, to store the transaction record data 235 to the LPC database, is provided below:

```
<?PHP
header('Content-Type: text/plain');
...
//store input data in a database
mysgl_connect("201.408.185.132",$LPC_server,$password); //access database server
mysgl_select("MMFEM_DB.SQL"); //select database to append mysgl_query("INSERT INTO ShareRecordTable (timestamp, purchase_summary_list, fund_id, share_num, share_type, share_price, share_fund_sector, share_name, share_ETF_type, user, account_name, account_type, account_num, billing_addres, zipcode, phone, sign, auth_key)
VALUES ($timestamp, $purchase_summary_list, $fund_id, $share_num, $share_type, $share_price, $share_fund_sector, $share_name, $share_ETF_type, $user, $account_name, $account_type, $account_num, $billing_addres, $zipcode, $phone, $sign, $auth_key);
// add data to TRadingLogTable table in a CLIENT database mysgl_close("LPC_DB.SQL"); //close connection to database
?>
```

FIG. 3A-3B provide exemplary logic flow diagrams illustrating logic flows for managing a closed-end exchange-traded fund within embodiments of the MMFEM. With reference to FIG. 3A, the MMFEM, e.g., a closed end fund company, etc., may purchase assets (e.g., securities, bonds, options, futures, ETFs, and/or other instruments, etc.) from first and/or secondary markets 301. In one implementation, the MMFEM may aggregate MMFEM assets and create a closed-end investment company, e.g., registering the closed-end investment company with SEC as a closed-end fund in compliance with SEC requirements 302.

In one implementation, the MMFEM may determine the NAV of the created closed-end investment company and issue an initial public offering of shares (e.g., which may be conducted on a periodic basis, etc.) 303. A user may purchase the MMFEM shares 304, and submit a MMFEM share trade request (e.g., the user may desire to purchase more shares or redeem its shares with the MMFEM) 305.

In one implementation, the MMFEM may determine whether such request is executable 306. For example, the MMFEM may operate the created closed-end investment company as a traditional closed-end fund, e.g., closed in the sense that capital does not regularly flow into them when investors buy shares, and it does not flow out when investors sell shares. After the initial public offering, shares are not traded directly with the sponsoring fund family, as is the case with open-end mutual funds. In such a scenario, the MMFEM may facilitate user transactions on a public exchange (e.g., NYSE, CBOE, NASDAQ, etc.), which may list MMFEM shares to be traded on the exchange 307, typically, and other market participants may act as the corresponding buyers or sellers. In one implementation, the MMFEM itself may not issue or redeem shares daily. Like stocks, MMFEMs may hold an initial public offering at their launch. With the capital raised during this IPO, the portfolio managers then buy securities befitting the fund's investment strategy. In further embodiments, the MMFEM may operate an ETF as a closed-end investment company that issues and redeems its shares on a daily basis, but in some instances may do so without disclosing its daily portfolio holdings on a real time basis (e.g., "non-transparent actively managed ETF). The MMFEM may engage in daily offers of closed-end fund shares to select institutional purchasers and/or daily offers to repurchase closed-end fund shares from select institutional sellers, e.g., in creation unit aggregations. In some implementations, the existence of the offering(s) of shares and/or the offer(s) to repurchase shares on a daily basis, the offer amount(s), pricing, offer deadlines, and/or associated fees may be described in some combination of the fund's registration statement, shareholder report, one or more websites owned and/or operated by affiliates of the fund. Such information may also (or alternatively) be communicated through agreements with select institutions eligible to purchase shares from and/or redeem shares directly to the fund.

In one implementation, the exchange may execute trades for MMFEM shares 308, and the user may in turn receive traded securities and/or new MMFEM shares from the exchange 309.

In another implementation, when the purchase or redemption request 305 is executable at the MMFEM server 306, e.g., when the MMFEM may operate the created closed-end investment company as an ETF, allowing continuous offerings of new shares, the MMFEM server may issue new shares and/or redeem shares, 307b. In one implementation, the price of newly issued shares (e.g., in a continuous offering) or the price of redemption may not be determined upon the NAV of the closed-end investment company. For example, after the IPO, a MMFEM's shares may trade on the open market, typically on an exchange, and the market itself determines the share price, e.g., the MMFEM server may obtain market price from the exchange 308b, and then execute a purchase/redemption transaction based on market price 309a.

In some implementations, transactions utilizing a daily purchase offer or daily tender offer process may be facilitated using a system that discloses the basket of securities and/or cash necessary to purchase shares of the fund or the securities and cash to be received in a redemption transaction.

Within implementations, such "closed-end" structure allowing trades of shares on the open market may give rise to discounts and premiums. After the IPO, a MMFEM's shares may trade on the open market, typically on an exchange, and the market itself determines the share price. The result is that the share price may not match the net asset value of the fund's underlying holdings. (Net asset value= (Fund Assets–Fund Liabilities)/Shares Outstanding). If the share price is higher than the net asset value, shares are said to be trading at a "premium," which may be portrayed as a "positive discount." For instance, a fund trading at a two percent premium would be shown as "+2%." If the share price is less than the net asset value, the shares are said to be trading at a "discount," which may be portrayed with a minus sign, "−2%."

In further implementation, the closed-end structure, unlike with open-end mutual funds, may not face reinvestment risk from daily share issuance, or may not have to hold excess cash to meet redemptions. Because there is no need to raise cash quickly to meet unexpected redemptions, the capital is considered to be more stable than in open-end funds. It is a stable capital base. The relatively stable capital base, in turn, gives rise to two other attributes: First, it makes MMFEMs a good structure for investing in illiquid securities, such as emerging-markets stocks, municipal bonds, timberland, etc. The higher risk involved with investing in illiquid securities could translate into higher returns to shareholders. Second, regulators may allow the funds to issue debt and preferred shares, with strict limits on leverage. The fund can issue debt in an amount up to 50% of its net assets. Another way to look at this is that for every $1 of debt, the fund must have $3 of assets (including the assets from the debt). This may be referred to as a 33% leverage limit.

In one implementation, MMFEM may issue preferred shares in an amount up to 100% of its net assets. Another way to look at this is that for every $1 of preferred shares issued, the fund may have $2 of assets (including the assets from the preferred shares), which may be referred to as a 50% leverage limit. As such, the MMFEM may not be highly leveraged, though any amount of leverage magnifies the volatility of the fund's net asset value.

In an alternative implementation, after the initial public offering at 303, the MMFEM may increase capital within the portfolio via various ways without continuously issuing new shares, e.g., by making sound investment choices that appreciate and thus increase the net asset value, by issuing debt, thereby leveraging the fund, by issuing preferred shares, thereby leveraging the fund, by conducting a secondary share offering (selling new shares to the public), by conducting a rights offering (giving existing shareholders the right to invest more capital into the fund in proportion to their existing ownership), and/or the like. In another implementation, the MMFEM may facilitate capitals to flow out of the fund by distributions to shareholders, unsatisfactory investment decisions, a tender offer to repurchase shares, which is a method to control discounts, for leveraged funds only, forced sales to remain in compliance of leverage limits, the liquidation of the fund, and/or the like.

FIG. 3B provides an example logic flow illustrating aspects of managing an actively traded fund within embodiments of the MMFEM. With reference to FIG. 3B, in one implementation, continuing on with 301, the MMFEM may instantiate a MMFEM structure 311, e.g., an exchange traded fund organized as a closed-end investment company that, pursuant to novel exemptions from various provisions of the Investment Company Act of 1940 and the Securities Exchange Act of 1934. In one implementation, the MMFEM structure may be allowed to create and redeem shares in creation unit aggregations at net asset value on a frequent basis in response to market demand. The shares may be listed on a securities exchange and traded intra-day at negotiated (market) prices.

In one implementation, if the MMFEM receives a share redemption or purchase request from a market participant 312, the MMFEM may determine a type of the request, e.g., whether to redeem or sell shares 312. The MMFEM may issue new shares to authorized participants at NAV on a periodic basis through a limited public offering 313a, or redeem shares from authorized participants at NAV on a periodic basis 313b. In one implementation, the MMFEM may calculate and publish the NAV of the fund hourly during the day 314; and then calculate and publish the difference between the NAV and the indicative price of the creation/redemption basket 315.

In one implementation, the MMFEM may further calculate SEC registration fees on an annual basis taking into account shares redeemed at NAV during prior years 316, and calculate shares outstanding for a closed end fund that periodically issues additional shares at NAV 317. In one implementation, upon receiving any order request, the MMFEM may enter orders to purchase and sell in the secondary market shares of a closed end investment company operating as an ETF 318, and/or execute such orders 319, e.g., on the secondary market or directly with the closed-end investment company via continuous offering of shares. The MMFEM may then update the accounts of the investors in such closed end investment companies to reflect purchases and sales 320. Further discussion of MMFEM order execution may be found in U.S. Pat. No. 7,720,749, which is herein expressly incorporated by reference.

In further implementations, the MMFEM may determine different processes to apply depending upon whether the created closed-end investment company is an equity fund or a fixed income fund, and such different processes may provide some level of transparency for the closed-end investment company. In further implementations, the MMFEM may include a master-feeder fund structure with feeders that include an ETF organized as a closed-end fund and a mutual fund (open-end), e.g., see 411a in FIG. 4B. For example, a fund operating as a feeder fund may invest its assets in a master fund.

Figure 3C:
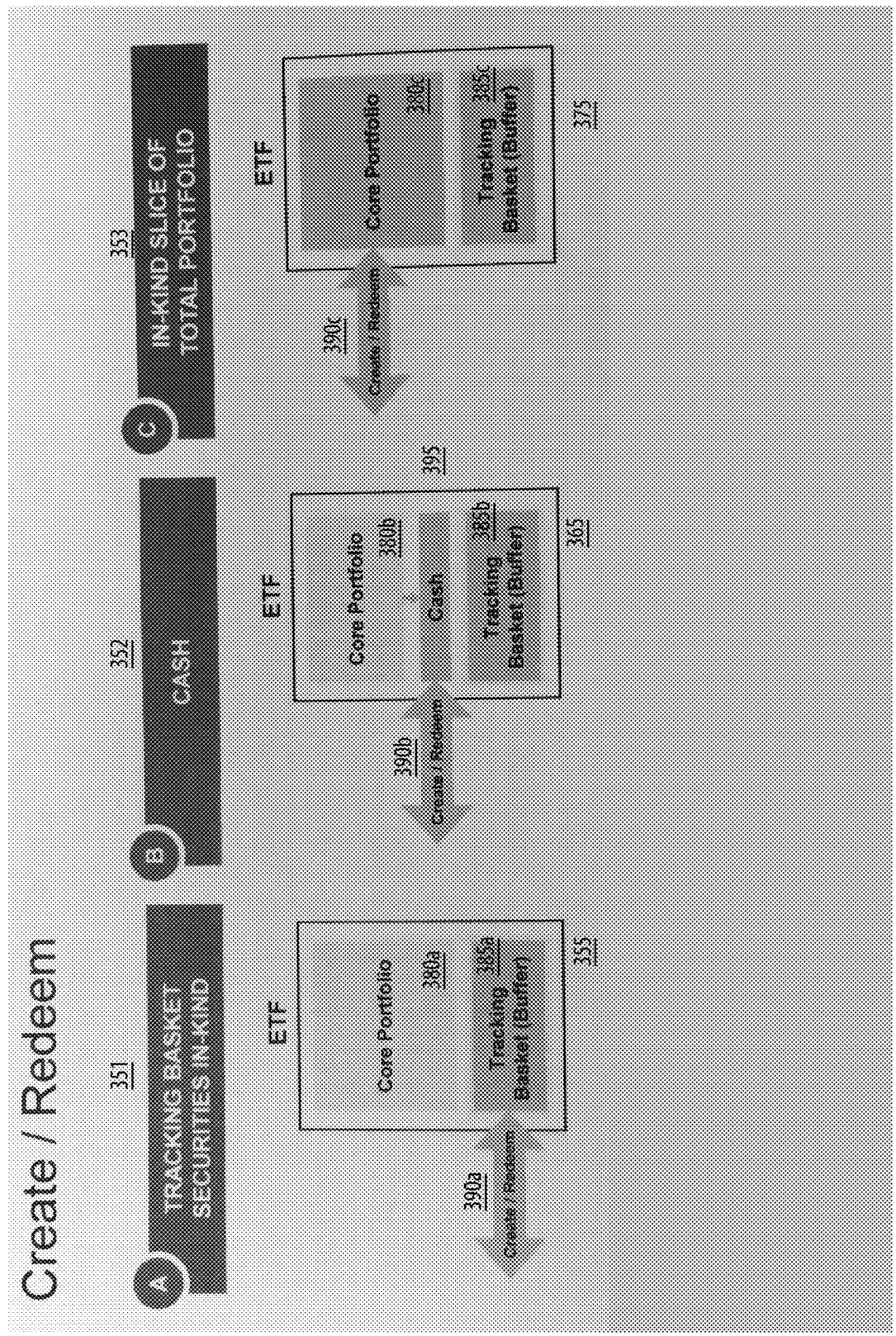

FIG. 3C provides exemplary creation/redemption process embodiments of the MMFEM. In this example, a request for asymmetric creation/redemption baskets is made wherein a tracking basket of securities in kind 351, where an ETF 355 with a core portfolio 380a and tracking buffer basket 385a has a create/redeem request 390a. Normally, creations and redemptions may be based on securities in kind in the tracking basket. However, during extreme situations (e.g., very large redemption exceeding tracking basket buffer capacity), alternative methods as outlined in this figure may be used for creations and/or redemptions within the ETF. In the cash phase 352, some of the core portfolio 380b may be used for cash 395 so as to supplement the tracking basket buffer 385 in the ETF 465 and satisfy the create/redeem request 390b. As a result in the in-kind slice of total portfolio phase 353, an in-kind slice of the total portfolio may then be used to satisfy the completion of the create/redeem 390 request and complete the ETF 375 asymmetric basket create/redeem process.

Figure 4A:
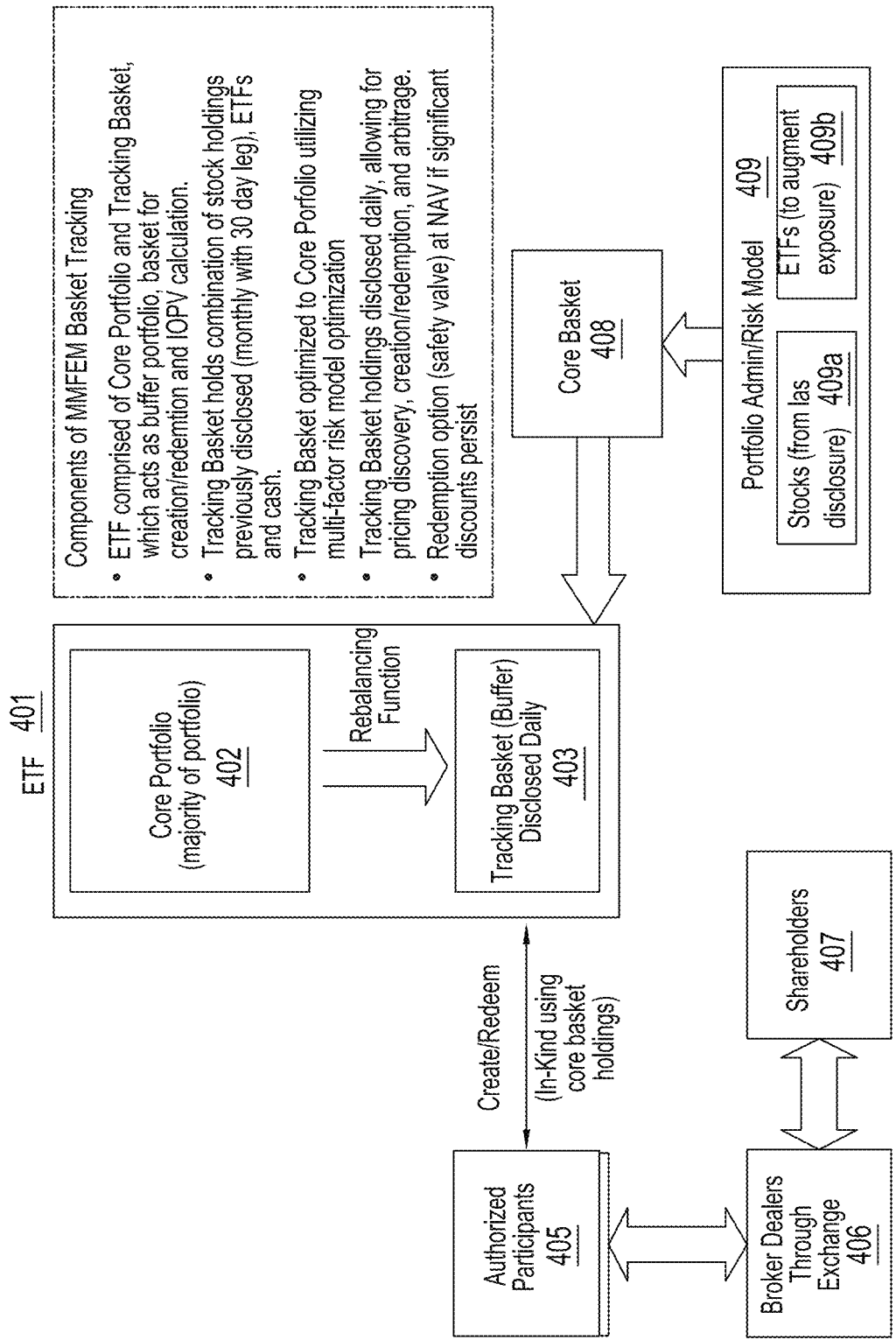
FIGS. 4A-4B provide an exemplary diagram illustrating infrastructure for basket tracking a closed-end exchange-traded fund structure within embodiments of the MMFEM.
Figure 4B:

FIGS. 4A-4B provide exemplary diagrams illustrating infrastructure for basket tracking a closed-end exchange-traded fund structure within embodiments of the MMFEM.

With reference to FIG. 4A, the MMFEM may utilize a tracking basket. In some implementations, a tracking basket works as follows:

In some implementations, an ETF 401 may be created and redeemed with the authorized participant 405. For example, it may be created and redeemed in the manner described above, but with at least one difference, which is the basket that is utilized. In some embodiments, the ETF is essentially comprised of two sleeves: core portfolio 402 and tracking basket (or buffer) 403. In some implementations, the core portfolio 402 may be managed just like mutual funds, and may make up the majority of portfolio (at scale, could be greater than 90%). In some embodiments, tracking basket 403 may seem to mimic the returns and exposures of the core portfolio. In some implementations, tracking basket of ETFs may track returns of the portfolio very closely. For example, one may track 85% of funds within 40 bps, which compares favorably given that 20% of ETFs may not track that closely on a given day.

In some implementations, holdings of funds may be disclosed monthly with 30 day lag. In some embodiments, these holdings may be used as basis for the tracking basket. In some embodiments, the MMFEM may utilize asset holdings (e.g., stocks, bonds, etc.) from the last disclosure 409a as well as ETFs to augment 409b the exposures utilizing a risk model and/or portfolio manager 409 to help construct a core basket 408 to be used by the ETF 401. For example, if a portfolio manager (PM) 409 had traded out of energy and into health care, the tracking basket may reduce energy stock positions and add health care ETF exposure. In some implementations, with growth of ETF strategies, the MMFEM may augment sector, industry, style, cap, country, region exposures.

In some embodiments, the tracking basket may also act as a buffer, so that create/redeems may be with the tracking basket (stocks and ETFs), and PM may receive it. In some embodiments, if flows persist a certain way and a buffer becomes too big, fund transfers what is in the tracking basket to the core, and the PM can sell what she wants. If buffer too small, fund transfers a slice of core portfolio, trades what is needed to form the tracking basket and sends that to authorized participants 405, which in turn may provide the assets to broker dealers through any number of exchanges 406 to eventually be provided to shareholders 407.

In some embodiments, the tracking basket will track the portfolio very closely (for example, with less than 20 bps tracking error). The MMFEM may calculate the difference between the value of the tracking/proxy basket and the fund NAV (e.g., tracking error) throughout the day and publish it to authorized participants (APs) 405. In some implementations, the MMFEM may provide a predictive tracking error, and users (for example, market makers) may feel more confidence that the tracking basket will hedge the risk to users in an arbitrage. In some implementations, portfolio managers may wish to obtain a portfolio as provided by MMFEM where, as an example, 80-90% of the securities in the tracking basket are the same as the Core Portfolio. In some implementations, the MMFEM may protect shareholders from being front-run, but also may mimic exposures.

With reference to FIG. 4B, a non-transparent active ETF 411 may be structured by employing a master/feeder mechanism 411a where a central portfolio that may act as the master, and ETF and mutual funds act as the feeders. Alternatively, mutual fund may be the master and ETF may act as the feeder. In the blind trust mechanism 411b, in some embodiments, ETF may in-kind create/redeem through the trust, and the trust may liquidate securities without disclosing them to the authorized participants (AP).

In some implementations, the holdings disclosure 412a may be more frequent than quarterly, but less frequently than daily. In some implementations, with reference to Tracking Baskets 412b, BPA may utilize a basket of securities that is optimized to the portfolio holdings. In some implementations, the utilization may be for price discovery and/or creation redemption. With reference to Risk Modeling 412c, in some embodiments, MMFEM may use risk modeling to generate IIV portfolio to represent risk characteristics of actual funds. With reference to pricing 412d, in some embodiments, the MMFEM may calculate and/or provide the indicative optimized portfolio value (IOPV) (i.e., the indicative intraday value, IIV) of a basket for an ETF operating as a closed end investment company, without disclosing holdings. In some implementations, the MMFEM may use 3rd party calculation agent that is under non-disclosure agreement (NDA). In some implementations, the MMFEM may price the fund more frequently than one time a day. Furthermore, in some embodiments, it may allow authorized participants to transact at multiple NAVs per day to lower premium per discount. In some embodiments, it may provide for executable iNAVs (NASDAQ). In still further embodiments, the MMFEM may calculate and/or publish the NAV of a closed end fund throughout the trading day.

With reference to Redemption Option 413a, in some embodiments, the MMFEM may allow shareholders to redeem at NAV under certain circumstances, e.g., when spread is greater than 5% for 10 consecutive business days (small allotment redemption option). The MMFEM may, in some embodiments, permit certain owners (e.g., retail shareholders) to redeem at NAV if a material deviation between NAV and the secondary market price persists (i.e., if a large discount exists between the end of day value of a portfolio and that of the secondary marketplace price). As such, the MMFEM may provide liquidity to shareholders, e.g., via an always-open tender offer, despite the closed-end structure of the fund. In some implementations, shareholders may instruct DTC participant (B/D) that they want to redeem, and proceeds may be distributed in cash. In some implementations, the MMFEM may determine if these options alone will keep spreads tight. In some implementations, the MMFEM may determine if one can arbitrage the portfolio with prices alone. In some implementations, the MMFEM may determine if one may need something that can be used on both sides of the arbitrage—the ETF shares and a basket of securities that represent it.

Figure 4C:
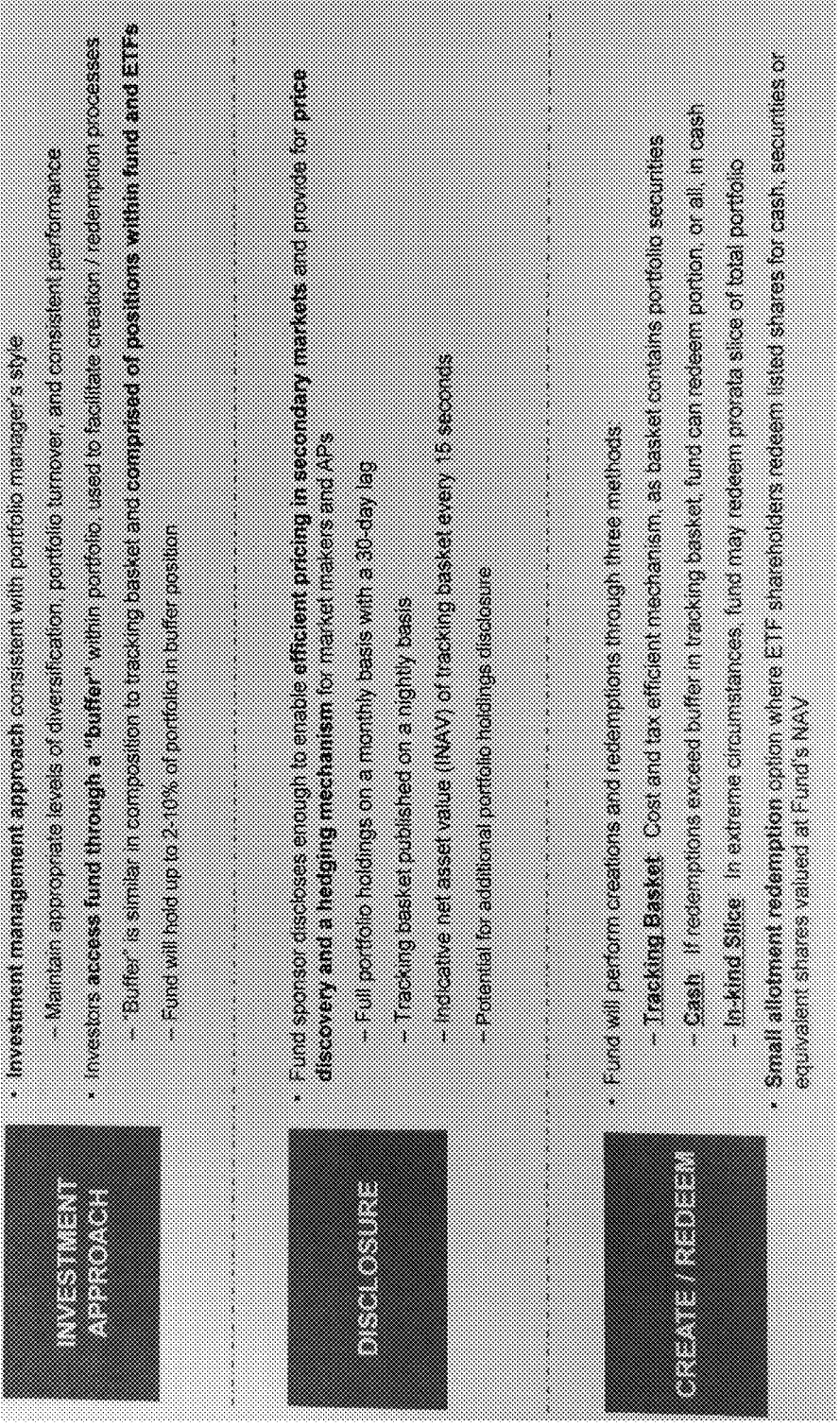
FIG. 4C provides an exemplary fund structure within embodiments of the MMFEM.

FIG. 4C provides an exemplary fund structure within embodiments of the MMFEM. It discusses example investment approaches, disclosure parameters (e.g., day-day lag, iNAV basket tracking interval of 15 seconds, etc.), and creation/redemption parameters. It should be noted that although such structures may be formed as registered investment companies, in one embodiment, the MMFEM represents the structure as a datastructure of accounts with parameter preferences, as described throughout the disclosure.

Master Feeder

Investment company sponsors may offer different types of funds that each issue shares representing the same portfolio of assets. For example, an investment company sponsor may offer a traditional open-end mutual fund, a commingled pool, and an ETF that track the same Index or follow the same, active investment strategy by investing in the same securities.

Described below are mechanisms that permit the MMFEM's open-end mutual fund, unregistered fund, e.g., a commingled pool, and ETF components/embodiments, each of which may track the same Index or that otherwise may employ the same investment strategy and thus may represent the same portfolio of assets, to pool assets into an investment structure (e.g., company) that is organized to hold and manage a common investment pool. This investment company, referred to herein as the master or master trust, may receive assets from the MMFEM components (e.g., open-end mutual fund, commingled pool, and ETF, etc.) and deposit those assets into a single pool of assets that are managed in the "master" trust). In one embodiment, each of those components exists as datastructures and executing instructions on computer processing systems, and asset movement is achieved via datastructure and database adjustments through information technology. This approach may provide economies or efficiencies for the open-end mutual fund, commingled pool, and ETF collectively referred to hereinafter as "feeders 529."

Figure 5A:
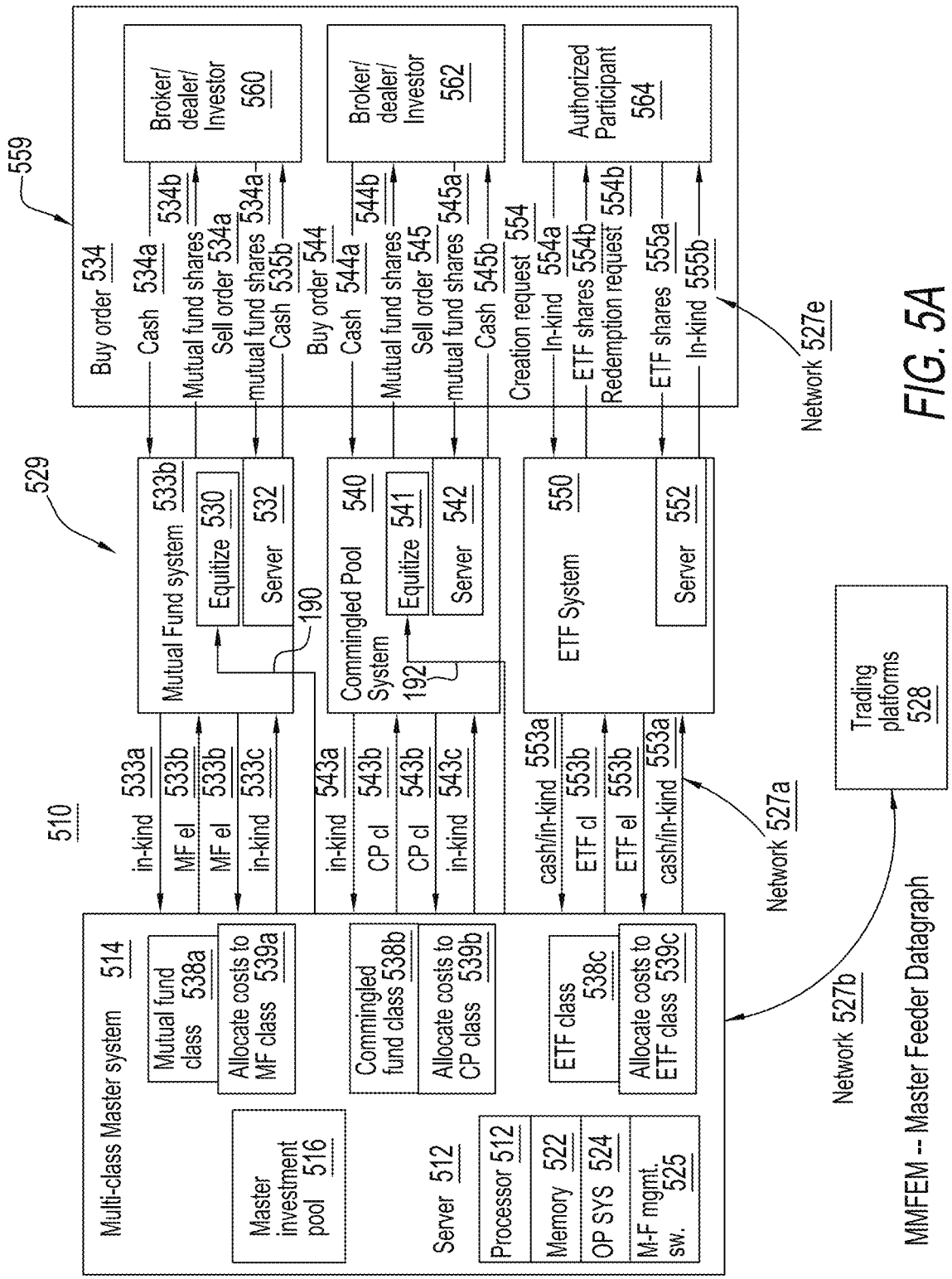
FIGS. 5A-5B provides an exemplary datagraph illustrating data flows between the master feeder flows that may be used by the MMFEM for either or both basket tracking on open and/or closed-end exchange-traded fund structures.
Figure 5B:
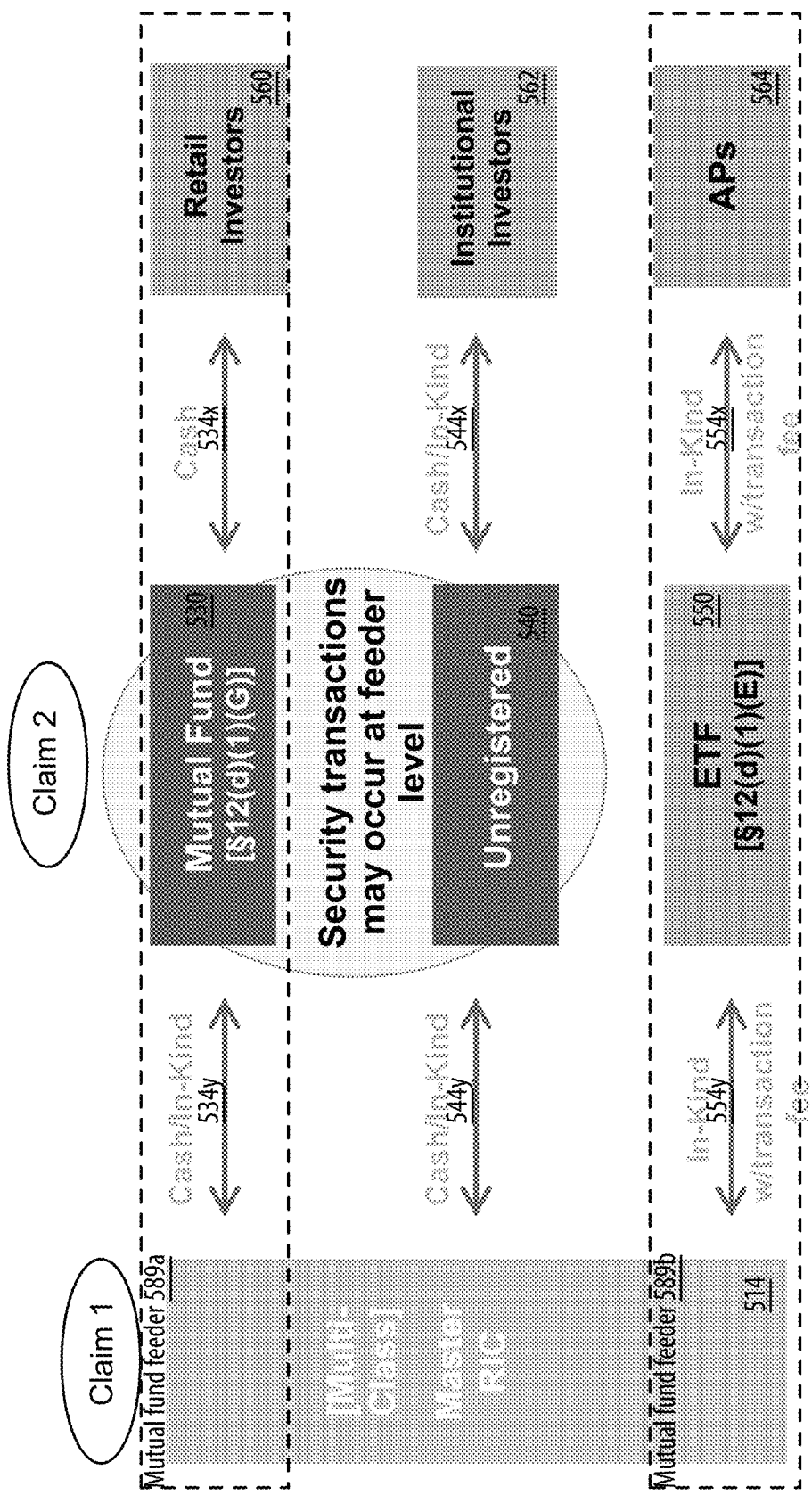

FIGS. 5A-5B provides an exemplary datagraph illustrating data flows between the master feeder flows that may be used by the MMFEM for either or both basket tracking on open and/or closed-end exchange-traded fund structures. Referring now to FIG. 5A, a multi-class master-feeder structure 510 includes a multi-class master system 514 (e.g., see FIG. 12 for an alternative embodiment), feeder systems 529 and investor systems 559. The multi-class master system 514 includes a server 512 that is one or more computer systems, including processor 520, memory 522 and an operating system software 524 and master-feeder component (e.g., management software) 525 (e.g., see 950 of FIG. 12 for another example), as will be described in FIG. 6. The master system 514 also includes a master investment pool 516, 716 and multiple, here three share classes, including a mutual fund share class 538a, a commingled pool share class 38b, and an ETF share class 538c.

The multi class master 514 issues different classes of shares, e.g., "(MF cl)", "(CP cl)" and "(ETF cl)" to each of the different, respective feeders 529. The multi-class master 514 enables allocation of expenses/costs 539a-539c to the respective feeders 529 through the share classes.

The master investment pool 516 holds assets for plural feeder investment companies, such as the mutual fund system 530, commingled pool system 540, and exchange traded fund (ETF) system 550, as shown. The master investment pool 516 through server 512 conducts securities transactions with trading platforms 528, via a network 527b. Such transactions involve other, conventional third party systems (not depicted) such as market makers, dealers, clearing houses, markets, exchanges, over the counter markets, etc.

Each of the mutual fund system 530, commingled pool system 540, and exchange traded fund (ETF) system 550 includes respective server computers such as the mutual fund system server 532, commingled pool system server 542, and exchange traded fund (ETF) system server 552 to manage transactions 533a-533d; 543a-543d; and 553a-553d, respectively, with the master system 514 over a network 527a. In some embodiments, these server computers can be the same server computer. That is, each feeder is operated on the same server or sets of servers, whereas in other embodiments the sets of server computers are different for each feeder. Each of the mutual fund system server 532, commingled pool system server 542, and exchange traded fund (ETF) system server 552 also manage transactions 534a-534d; 544a-543d; and 554a-554d, and 535a-535d; 545a-545d; and 555a-555d, respectively with participant systems 559, e.g., broker/dealer or Investor systems 560, broker/dealer or investor systems 562 and authorized participant systems 564 over a network 527c. Separate systems to manage transactions with the master and transactions with the participant systems 559 could be used.

In this structure, the mutual fund system 530 and commingled pool 540 include equitize mechanism 531, e.g., as shown for the mutual fund system 530 and equitize mechanism 541 as shown for the commingled pool. The equitize mechanism 531, 541 causes the mutual fund, commingled pool to equitize cash received from investors (transactions 534a, 544a) into in-kind securities, accordingly to a portfolio required by the master, which is either sent via a message 590, 592 (or inferred or otherwise), that are transferred to the master (transactions 533a, 543a) (often with a small amount of "balancing cash") when buying master shares, and requires the feeders to receive securities from the master (transactions 533c, 543c) (often with a small amount of "balancing cash") and de-equitize the shares into cash to deliver (transactions 534c, 544a) to investors when selling master shares back to the master. By requiring that the feeders equitize cash into securities, this arrangement, isolates transaction costs and potential tax implications to the respective feeder structures 530, 540 rather than the master trust 514. In some embodiments, ETF feeders can invest in the master entirely in cash.

The broker dealer systems/investor systems 560, 562 are meant to indicate that the transactions can be performed by either or both of broker dealer systems and investor systems. Further, in some embodiments, systems 560, 562 and possibly system 564 need not be computer systems but could be other types of systems. For example, some mutual funds investors could buy/sell shares directly with the mutual fund, via telephone or mail and thus need not deal with a broker dealer or use a computer to make such transactions. With respect to the mutual fund system 530, broker dealer and/or individual investors transact directly with mutual fund system 530 to purchase or sell mutual fund shares. The mutual fund transacts with a broker dealer and/or individual investors at the next calculated net asset value (NAV) of the mutual fund, as will be described below.

An entity that desires to purchase shares or sell existing shares of a mutual fund purchases or sells the shares either directly with the mutual fund or through a broker-dealer that purchases or sells shares directly with the mutual fund. Typically, the mutual fund pays cash to a shareholder when selling shares in an amount equal to the next-published NAV per share sold, but may give the shareholder a slice of the fund's portfolio of securities equal to the value of shares sold (where, again, the shares and portfolio securities are valued according to the fund's next-published NAV). The latter scenario is referred to as "redemption in kind." With respect to the commingled system 540, investors transact directly with commingled system 540, typically only to the extent that the investors are part of a legal trust, e.g., a 401K plan or the equivalent.

With respect to the ETF system 550, only "authorized participants" 564 may transact directly with ETF system 550 to purchase or redeem ETF shares. An authorized participant is an entity chosen by an investment company that operates and sponsors the ETF system to undertake the responsibility of obtaining the assets needed to create ETF shares. Authorized participants also may make markets in the ETF shares for their own account, or may act as agent or principal with respect to transactions on behalf of their customers. Authorized participants are typically broker dealers. Once an authorized participant receives ETF shares, the authorized participant may trade those shares on a secondary market.

Typically, the ETF system 550 creates or redeems ETF shares in collections of a predefined size. A collection of this predefined size is called a creation unit. Creation units are typically 50,000 shares, but in principle may be any size. Authorized participants transact with the ETF system 550 in creation unit aggregations (typically in kind) 554 (pre-determined group of financial assets or cash) as a medium of exchange. The ETF system 550 transacts with the master trust 514 (or in some embodiments a master organized as a partnership) by transferring the received media of exchange to the master trust and receiving in exchange a predetermined number of shares in the master trust.

The medium of exchange with an ETF may include both securities and cash, in a so-called "hybrid" transaction, all securities or all cash. Such a hybrid transaction is appropriate when, for example, it would be impractical for the authorized participant to obtain a part of the requisite pre-determined group of financial assets because some such financial assets are in short supply. In this case, the authorized participant may replace the unavailable financial assets with an agreed upon amount of cash.

Note in some implementations trading platforms 528 (shown) need not be accessed by the master system 514, whereas such trading platforms would be accessed (not shown) by the equitize functionality 531, 541. When the feeders equitize cash into securities, this arrangement, isolates transaction costs and potential tax implications to the feeder structures 530, 540 that incur them rather than requiring the master trust 514 to bear these costs.

FIG. 5B shows a datagraph diagram illustrating alternative embodiments of the MMFEM. Building on master feeder embodiments already described in FIG. 5A and throughout the disclosure, this multichannel master feeder structure combines assets from various channels into a single pool. As such, the MMFEM has a number of advantages over existing ETFs (e.g., such as Vanguard's existing share class ETF), including: transaction costs and gains/losses are borne by those that cause them; an ability to better manage unrecognized gains in the master fund; reduction in data path and cash drag. To achieve these efficiencies, the MMFEM may experience some limitations such as ETF Feeder being potentially less tax efficient than a standalone ETF; and tax free exchanges among feeders may not be possible in some situations.

The top row shows a mutual fund feeder 589a while the bottom row shows an ETF feeder 589b. Retail investors 560 contribute cash 534x to the mutual fund 530, the feeder has a transfer agent and the feeder counts up the cash as its received and issues the appropriate number of whole and fractional shares (per previous discussion), then the transfer agent passes that cash to the mutual fund 530, and the mutual fund portfolio manager then invests the cash consistent with the objective of the fund. In the previous embodiments in FIG. 5A, the mutual fund feeder 530 would pass that cash straight into the master fund 514 (e.g., a registered investment company). In this multifeeder embodiment, however, the mutual fund is configured to save on transactional costs and increase efficiencies (e.g., avoiding taxable gains and losses) by avoiding cash transactions contributions from the mutual fund 530 to the master 514. This even has benefits for the ETF feeder as it may also be providing securities in kind to the master, as those cash transactions may affect the ETF negatively as well. As such, in this embodiment, the mutual fund feeder 589a, 530 would only contribute securities in-kind up to the master 514 where the mutual fund 530 (a) equitizes the cash 534x it receives from retail investors 560 and (b) through, the master fund's transfer agent, decides at what point it can contribute the creation unit of value up into the master 514 and receive shares of the master fund 514, 534y. The creation unit is important as the ETF 550 and mutual fund 530 should transact with the master 514 on the same terms; i.e., where the ETF 550 sends creation units up into the master 514, the mutual fund 530 will also do the same, which has the benefit of all the transaction costs and related gains and losses created by mutual fund shareholders, now, sit in the mutual fund without polluting the master 514. As such, the MMFEM has a process where cash 534x into the mutual fund 530 is equitized by the portfolio manager consistent with the goals of the master fund, and, there may be a routine (e.g., periodically, daily, on demand, dynamically, continuously, etc.) where the master funds 514 transfer agent will examine the value of the securities in the feeder and assess how that value corresponds to that day's creation basket's value, which will be used for purposes of creations and redemptions. In one embodiment, each day and ETF may send a portfolio composition file (PCF) and may include a list of securities and their weights that the ETF wants to receive, and the value of that total creation basket (e.g., as of the close of the prior night), which, again, may be used for purposes of creations and redemptions. Mutual fund 530 transfer agents, similarly, will take the PCF and look at the securities in the mutual fund 530 and take a look at the value of the securities accumulated in the mutual fund 530, and at the point in time that that it represents a creation unit, it will clean it out of the mutual fund 530 and push it off into the master 514, and issue the mutual fund the appropriate amount of master fund shares 534-y. This process may happen automatically. In one embodiment, the master's 514 objective may all have that same objective and strategy, although they may achieve that differently, e.g., the master fund 514 invests in securities to meet its objective, the ETF invests in shares of the master 530, and the mutual fund 530 invests in (a) securities, which are represented by the PCF (i.e., which is created by the master fund portfolio manager of the securities it wants delivered each day-akin to an index/pro-rata slice of its portfolio), and (b) it will hold shares of the master 530 as well. This structure has the advantage of assembling a large pool of assets among the feeders (e.g., a bond fund which would otherwise be difficult to buy them in small and/or odd lot size) and larger shares are often efficient, which are afforded by the larger pool. This structure lets you blend an ETF and a mutual fund in the same pool, each of which may have completely different tax implications, and even when those tax policies are completely different, the in-kind MMFEM mechanism allows us to provide low cost basis securities to APs from the ETF without realizing gains in the portfolio on those securities.

Figure 6:
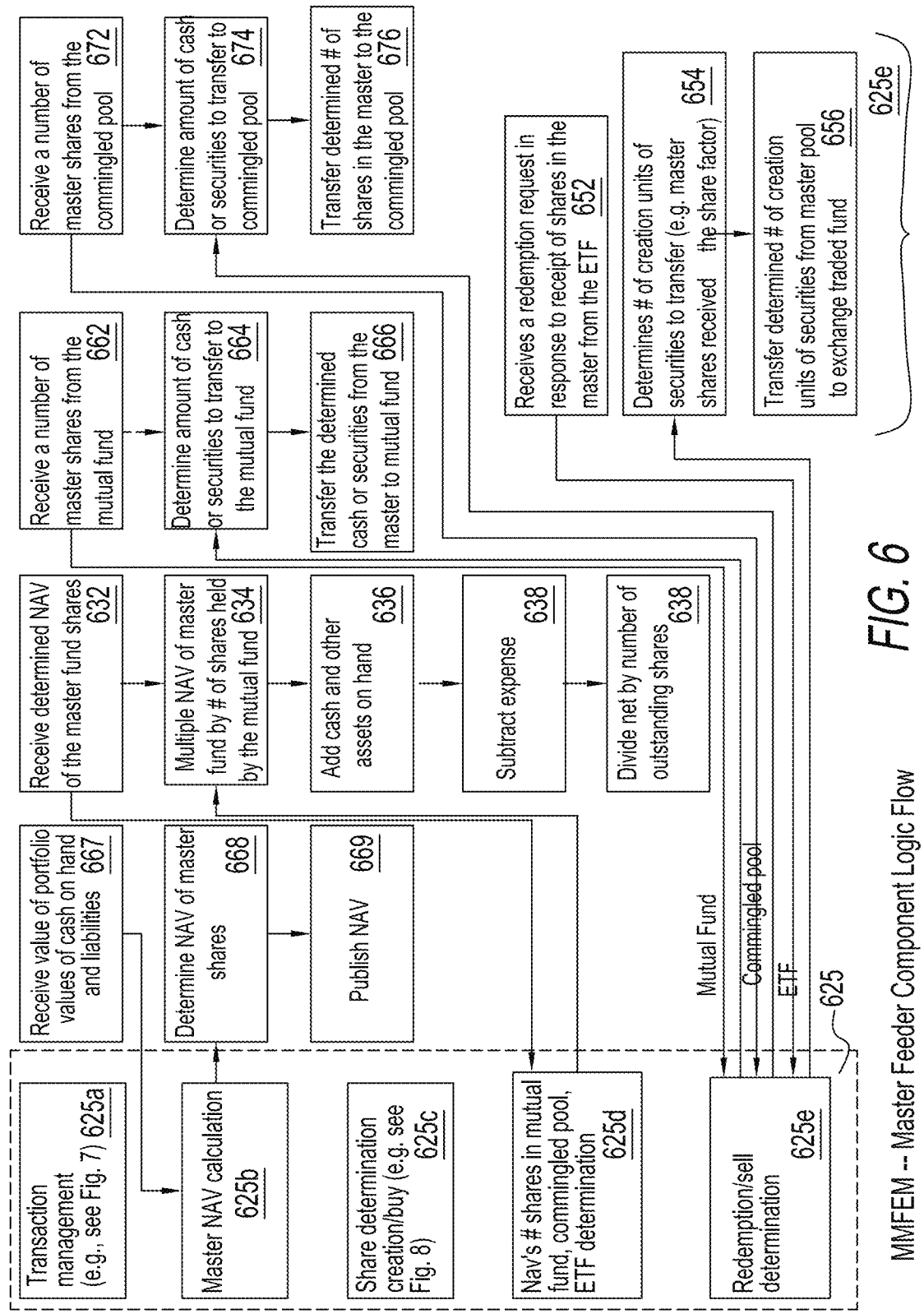
FIGS. 6-8 provide exemplary logic flow diagrams illustrating logic flows for master feeder management components of the MMFEM.
Figure 7:
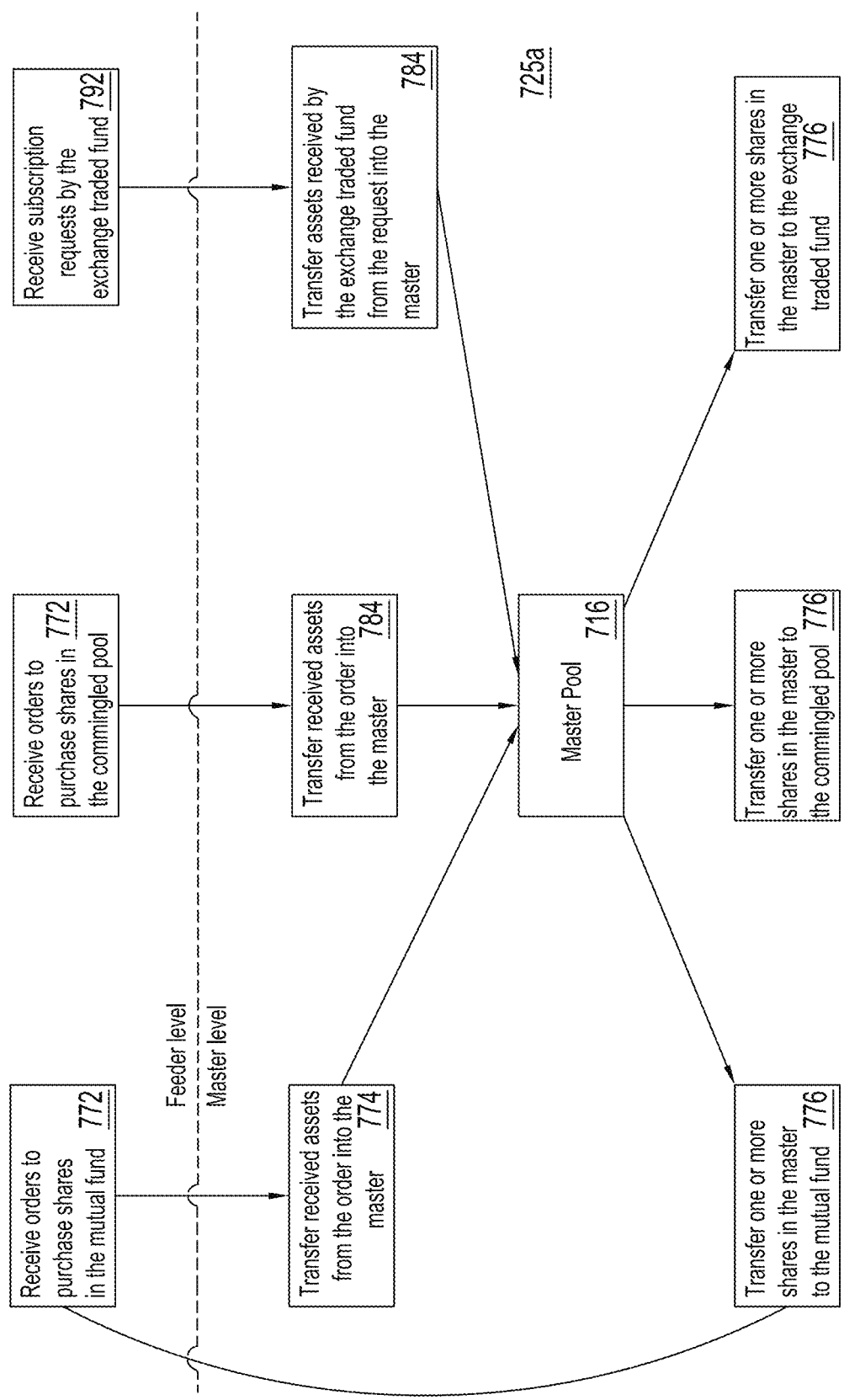
Figure 8:
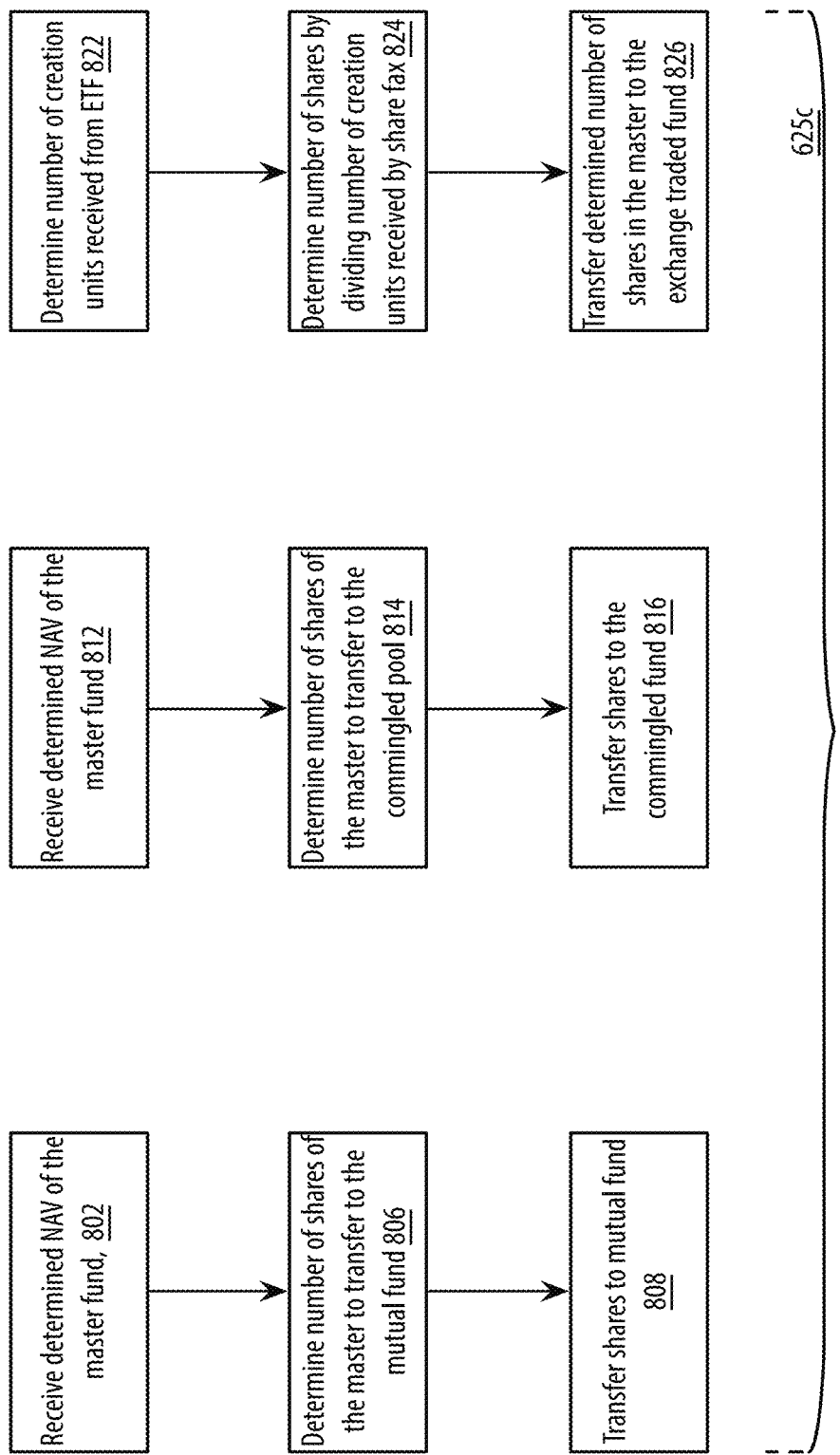

FIGS. 6-8 provide exemplary logic flow diagrams illustrating logic flows for master feeder management components of the MMFEM;

Referring now to FIG. 6, the master-feeder management component 525 of FIG. 5, 950 of FIG. 12, 625 includes transaction management mechanism 625a to interact with the feeder structures 529 that feed into the master investment pool 516 of FIG. 5 (e.g., see FIG. 7 below for more detail). The master-feeder management component 525, 625, 950 includes NAV calculations 625b to determine an NAV of master shares. The master-feeder management component 525, 625 also includes share determination processing 625c to determine a number of master shares to issue to the feeders 629. The master-feeder management component 525, 625, 950 also includes NAV share determination for mutual fund, commingled pool and ETFs, as well as redemption processing 625e to determine an amount of assets to return to feeders 529 in response to redemption requests and identify specific security types and lots to deliver based on various factors. The master-feeder management component 525, 625, 950 may include other mechanisms, such as share class accounting.

Referring now to FIG. 7, (and also FIG. 5 for transactions) for the mutual fund that receives 772 orders (transaction 534 of FIG. 5) to purchase shares in the mutual fund, the master-feeder management component 525, 625, 950 transaction management 625a causes the server 528 to transfer 774 the received assets that accompany (e.g., according to settlement rules) the order to the multi-class master 514 (transaction 533a of FIG. 5) upon settlement and transfer 776 shares in the master 716 to the mutual fund (transaction 533b of FIG. 5).

For the commingled pool that receives 782 orders (transaction 544 of FIG. 5) to purchase shares in the commingled pool, transaction management 625a causes the server to transfer 784 received assets that accompany the order into the master 716 (transaction 544a of FIG. 5) and transfer 786 shares in the master 716 to the commingled pool (transaction 544b of FIG. 5).

For the ETF that receives 792 creation (or subscription) requests (transaction 554 of FIG. 5), transaction management 625a causes the server 528 to transfer 794 assets received from the exchange traded fund from the request into the master (transaction 554a of FIG. 5) and transfer 796 shares in the master to the exchange traded fund (transaction 554b of FIG. 5).

Referring back to FIG. 6, the master-feeder management component 525, 625, 950 calculates the NAV of the master fund shares 625b, by receiving 667 values of the securities, cash and liabilities and determining the NAV 668 in a number of ways. Example NAV computations are shown below. Thereafter it publishes 669 an NAV valuation of master trust shares. This calculation may be performed periodically, on demand, dynamically, continuously, etc., and, for example, may be performed each business day at the close of trading.

In one embodiment, the master-feeder management component 525, 625, 950 determines the NAV of the master fund at the end of a trading day generally as follows:

$$NAV_M = (V+C-L)/S_M$$

where:
- $NAV_M$ is the net asset value of a master share
- V is the total value of securities in the investment pool 516, 716
- C is cash on hand (and other assets)
- L liabilities (expenses, fees of the master fund)
- $S_M$ total number of outstanding shares in master In another embodiment, certain assets and fees/expenses can be allocated among the share classes. In such an embodiment the NAV may calculated generally as follows:

Mutual Fund Class:

$$NAV_{Mmf\,class} = (V-L_m-L_{mf}+C_{mf})/S_M$$

where:
- $NAV_{Mmf}$ class is the net asset value of a master share for the mutual fund class
- V is the total value of securities in the investment pool 516, 716
- $C_{mf}$ is cash on hand (and other assets) attributed to the mf class
- $L_m$ are liabilities attributed to all classes (general expense of the master)
- $L_{mf}$ are liabilities attributed to the MF class (expenses chargeable to the mutual fund, 539a)
- $S_M$ total number of outstanding shares in master Commingled Fund Class:

$$NAV_{Mcd\,class} = (V-L_m-L_{cd}+C_{cd})S_M$$

where:
- $N_{AVMcd}$ class is the net asset value of a master share for the mutual fund class
- V is the total value of securities in the investment pool 516, 716
- $C_{cd}$ is cash on hand (and other assets) attributed to the cd class
- $L_m$ are liabilities attributed to all classes (general expense of the master)
- $L_{cd}$ are liabilities attributed to the cd class (expenses chargeable to the commingled fund, 539b)
- $S_M$ total number of outstanding shares in master ETF Class:

$$NAV_{Metf\,class} = (V-L_m-L_{etf}+C_{etf})S_M$$

where:
- $NAV_{Metf\,class}$ is the net asset value of a master share for the ETF class
- V is the total value of securities in the investment pool 516, 716
- $C_{etf}$ is cash on hand (and other assets) attributed to the eft class
- $L_m$ are liabilities attributed to all classes (general expense of the master)
- $L_{eFT}$ are liabilities attributed to the etf class (expenses chargeable to the ETF, 539c, such as transaction fees incurred by creation/redemption)
- $S_M$ total number of outstanding shares in master Thus, when the mutual fund system 530, the commingled pool system 540 and the ETF system 550 of FIG. 5, each calculate their respective NAV's, the respective feeders 529 will use the NAV for the respective class, which reflects differences in expenses and fees charged by the master to that class to account for the allocation of expense/fees to the different share classes.

The share determination processing component 625c determines the number of shares to transfer to each of the feeders 529 in response to receipt of assets from the respective feeders 529 of FIG. 5.

Moving to FIG. 8 momentarily to discuss the share determination processing component 625c in more detail, as it determines 822 for creation requests (also referred to herein as subscription requests) received by the ETF system 550, a number of creation units worth of assets received from the ETF system 550 as a result of the received creation request. The share determination processing 625c determines 824 the number of shares to transfer by dividing number of creation units received by a share factor. The master-feeder management component 525, 625 causes a transfer 826 of the determined number of shares in the master to the ETF system 50. The master-feeder management component 525, 626, 950 can use a share factor of one to one. That is, for a creation unit size of in-kind assets transferred into the master, the master will issue one master share to the ETF system 550. Alternatively, the master-feeder management component 525, 625, 950 can use a share factor of one ETF share corresponds to one master share. That is, for a creation unit size of in-kind assets transferred into the master, that equates to, e.g., 50,000 ETF shares, the master will issue 50,000 master shares to the ETF system 550. These are but several examples, and any share factor ratio of master shares to equate to a creation unit could be used. In addition there can be a 1 to 1 ratio among the classes or other ratios.

The master may issue either whole or whole and fractional numbers of master shares to the mutual fund system 530 in response to a receipt of securities from the mutual fund system 530 of FIG. 5. Any of a number of ways can be used to determine the number of master shares to issue. For example, the master receives/retrieves 802 the NAV of the master fund shares and determines 804 the number of shares to transfer to the mutual fund by dividing the total value of the securities received from the mutual fund system 530 by the NAV of a master share, and transfers 806 the resulting number of master shares in the master that equate to the total value of cash and/or securities received from the mutual fund system 530 of FIG. 5.

The master-feeder management component 525, 625, 950 may determine shares for the commingled pool system 540 in a similar manner as for the mutual fund system 530 of FIG. 5. The master issues either whole or whole and fractional numbers of master shares to the commingled pool system 540 in response to a receipt of securities from the commingled pool system 540 of FIG. 5. Any of a number of ways can be used to determine the number of master shares to issue. For example, the master receives/retrieves 812 the NAV of the master fund shares and determines 814 the number of shares to transfer to commingled pool by dividing the total value of the cash and/or securities received from the commingled pool system 540 by the NAV of a master share and transfers 816 the resulting number of master shares in the master that equate to the total value of cash and/or securities received from the commingled pool system 540.

Referring back to FIG. 6, NAV's of shares in the mutual fund, commingled pool and ETF are determined by the respective mutual fund, commingled pool and ETF server systems 532, 542 and 552 of FIG. 5. For example, the mutual fund at the close of trading receives 632 the determined NAV of the master fund shares and multiplies the received NAV of master fund shares by the number of master shares held by the mutual fund 634 to provide a first value. To this first value, the amount of cash and other assets held by the mutual fund on hand is added 636 and liabilities (expenses and fees) of the mutual fund are subtracted 638, providing a second value. From this second value, the NAV per share is determined by dividing this second value by number of outstanding shares in the mutual fund 640. An example generalized calculation is below.

$$NAV_{mf} = ((NAV_M * N) + C - L))/S_{mf}$$

where:
- $NAV_{mf}$ is the net asset value of a mutual fund share
- $NAV_M$ is the net asset value of a master share
- N is the number of master shares
- C is cash on hand (and other assets)
- L liabilities (expenses, fees chargeable to mutual fund shareholders)
- $S_{mf}$ total number of shares in the mutual fund Similar calculations can be provided for the ETF and the commingled pool to provide corresponding NAV's using the respective values of cash on hand and expenses.

Unlike an ETF, the mutual fund system 530 and commingled pool system 540 may have significant amounts of cash on hand either because the mutual fund system 530 and commingled pool system 540 need to maintain a certain amount of cash to cover sales of shares back to the mutual fund system 530 and commingled pool system 540 of FIG. 5 or because the cash from shareholder purchase of mutual fund or commingled pool shares cannot be readily invested in the desired securities. This so called "cash drag" serves to potentially lower the return of a mutual fund and a commingled pool, and which is typically not a concern in an ETF. Thus, by having the mutual fund and the commingled pool hold cash that cannot yet be invested in the mutual fund system 530 and commingled pool system those systems and not the ETF system 550 would bear the effects of the cash drag. In some implementations the ETF system 550 may also have hold significant amounts of cash and thus in this implementation the ETF system 550 would bear the effects of cash drag.

In addition, the master-feeder management component 525, 625, 950 also includes redemption processing 625d to determine the amount of assets to transfer to each of the feeders 529 in response to receipt of redemption requests or sell orders. The master-feeder management component 525, 626, 950 will also determine/identify specific lots for transfer to the various feeders depending on which feeder is redeeming.

The master-feeder management component 625 redemption determination component 635e receives 652 a redemption request in response to receipt of shares in the master from the ETF, and thus determines the number of creation units of securities to send to the ETF feeder. Typically ETF's only deal in whole number creation unit sizes. The master-feeder management software 625e determines 654 the number of creation units of securities to transfer by dividing (implicitly or explicitly) number of master shares received by the share factor (used during creation of ETF shares), and thereafter transfers 656 the determined number of creation units of securities from the master investment pool 516 to the exchange traded fund. The master-feeder management component 625 uses the same share factor as was used for creation requests (e.g., one (1) master share equals one (1) creation unit or one (1) master share equals one (1) ETF share) or other ratios, as discussed above.

The redemption/determination component 625e of the master-feeder management component 625 also includes a mechanism to determine the amount of cash or shares to transfer to the other two feeders 529, e.g., the mutual fund and the commingled pool in response to receipt of sell orders from those feeders 529.

For the mutual fund, the sell processing 625e uses the determined NAV value of a master share at closing prices of securities. The master receives 662 a number of master shares from the mutual fund. Given the number of master shares, the master and/or the master-feeder component 625 will determine the amount securities to issue the mutual fund, e.g., in an amount equal to the value of master shares sold back to the master 664. For the in-kind transfers of securities, the master transfers 166 that value of in-kind securities to the mutual fund, such as by a/transfer of a slice of the pool that equates to the value of the master shares tendered back to the master fund from the mutual fund at the NAV of the master shares. In the platform of FIG. 5, when the master transfers securities the master does not typically incur transaction costs. Similar considerations apply for the commingled pool.

For the commingled pool, the sell processing 625e uses the determined NAV value of a master share at the closing prices. The master receives 672 a number of master shares from the commingled pool. Given the number of master shares, the master and/or the master-feeder component 625 will determine the amount securities to issue to the commingled pool, e.g., in an amount equal to the value of master shares sold back to the master 674. For the in-kind transfers of securities, the master transfers 676 that value of in-kind securities to the commingled pool, for example, transferring of a slice of the pool that equates to the value of the master shares tendered back to the master fund from the commingled pool at the NAV of the master shares For redemption processing, the NAV used be either the embodiment of the single NAV that applies to all share classes or the embodiment of the NAV that calculates separate NAV's for each feeder, according to the particular embodiment of the system 510 of FIG. 5.

As will be discussed in greater detail below in FIG. 9, participant devices can be any sort of device such as a telephone to receive orders and/or a computing device capable of taking input from a user and communicating over a network with a server and/or with other client devices, as appropriate. For example, a mobile device, a desktop computer, a laptop, a cell phone, a private digital assistant ("PDA"), a server, an embedded computing system, a mobile device, and so forth could be used as a participant device. Servers can be any of a variety of computing devices capable of receiving information, such as a server, a distributed computing system, a desktop computer, a laptop, a cell phone, a rack-mounted server, and so forth. Server may be a single server or a group of servers that are at a same location or at different locations. Servers can receive information from client devices via interfaces. Interfaces can be any type of interface capable of receiving information over a network, such as an Ethernet interface, a wireless networking interface, a fiber-optic networking interface, a modem, and so forth. Server also includes a processor and memory. A bus system (not shown), including, for example, an information bus and a motherboard, can be used to establish and to control information communication between the components of server.

MMFEM Controller

Figure 9:
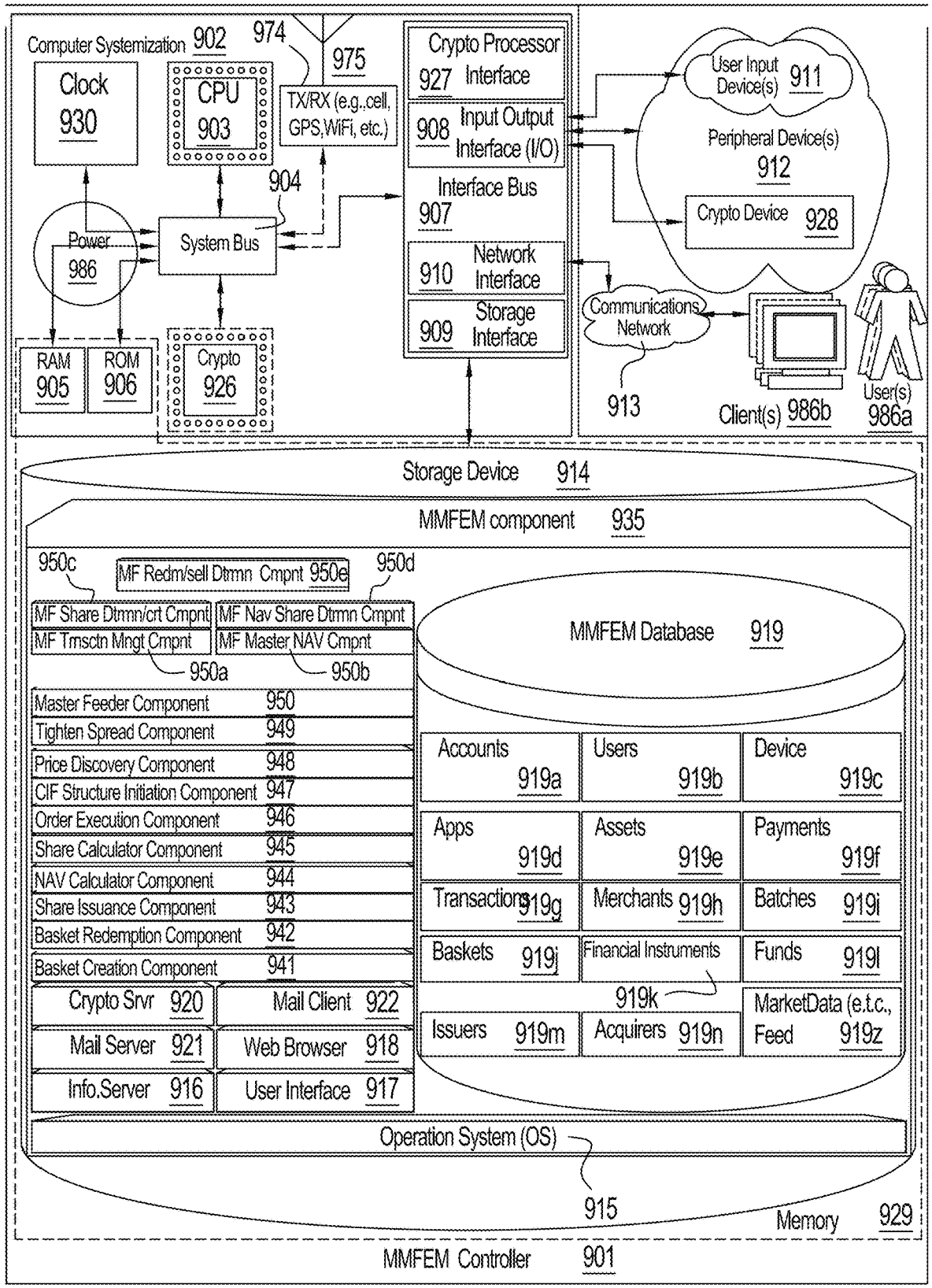
FIG. 9 shows a block diagram illustrating embodiments of a MMFEM controller.

FIG. 9 shows a block diagram illustrating embodiments of a MMFEM controller. In this embodiment, the MMFEM controller 901 may serve to aggregate, process, store, search, serve, identify, instruct, generate, match, and/or facilitate interactions with a computer through data structures and information management asset management technologies, and/or other related data.

Typically, users, which may be people and/or other systems, may engage information technology systems (e.g., computers) to facilitate information processing. In turn, computers employ processors to process information; such processors 903 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 929 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the MMFEM controller 901 may be connected to and/or communicate with entities such as, but not limited to: one or more users from user input devices 911; peripheral devices 912; an optional cryptographic processor device 928; and/or a communications network 913.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The MMFEM controller 901 may be based on computer systems that may comprise, but are not limited to, components such as: a computer systemization 902 connected to memory 929.

Computer Systemization

A computer systemization 902 may comprise a clock 930, central processing unit ("CPU(s)" and/or "processor(s)"

(these terms are used interchangeable throughout the disclosure unless noted to the contrary)) 903, a memory 929 (e.g., a read only memory (ROM) 906, a random access memory (RAM) 905, etc.), and/or an interface bus 907, and most frequently, although not necessarily, are all interconnected and/or communicating through a system bus 904 on one or more (mother)board(s) 902 having conductive and/or otherwise transportive circuit pathways through which instructions (e.g., binary encoded signals) may travel to effectuate communications, operations, storage, etc. The computer systemization may be connected to a power source 986; e.g., optionally the power source may be internal. Optionally, a cryptographic processor 926 may be connected to the system bus. In another embodiment, the cryptographic processor and/or transceivers (e.g., ICs) 974 may be connected as either internal and/or external peripheral devices 912 via the interface bus I/O 908 (not pictured) and/or directly via the interface bus 907. In turn, the transceivers may be connected to antenna(s) 975, thereby effectuating wireless transmission and reception of various communication and/or sensor protocols; for example the antenna(s) may connect to various transceiver chipsets (depending on deployment needs), including: Broadcom BCM4329FKUBG transceiver chip (e.g., providing 802.11n, Bluetooth 2.1+EDR, FM, etc.); a Broadcom BCM4750IUB8 receiver chip (e.g., GPS); a Broadcom BCM4335 transceiver chip (e.g., providing 2G, 3G, and 4G long-term evolution (LTE) cellular communications; 802.11ac, Bluetooth 4.0 low energy (LE) (e.g., beacon features)); an Infineon Technologies X-Gold 618-PMB9800 transceiver chip (e.g., providing 2G/3G HSDPA/HSUPA communications); a MediaTek MT6620 transceiver chip (e.g., providing 802.11 a/b/g/n, Bluetooth 4.0 LE, FM, global positioning system (GPS) (thereby allowing MMFEM controller to determine its location); a Texas Instruments WiLink WL1283 transceiver chip (e.g., providing 802.11n, Bluetooth 3.0, FM, GPS); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large mainframe computers, down to mini computers, servers, desktop computers, laptops, netbooks, tablets (e.g., iPads, Android and Windows tablets, etc.), mobile smartphones (e.g., iPhones, Android and Windows phones, etc.), wearable devise (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 929 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; Apple's A series of processors (e.g., A5, A6, A7, etc.); ARM's application, embedded and secure processors; IBM and/or Motorola's DragonBall and PowerPC; IBM's and Sony's Cell processor; Intel's 80X86 series (e.g., 80386, 80486), Pentium, Celeron, Core (2) Duo, i series (e.g., i3, i5, i7, etc.), Itanium, Xeon, and/or XScale; Motorola's 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the MMFEM controller and beyond through various interfaces. Should processing requirements dictate a greater amount speed and/or capacity, distributed processors (e.g., Distributed MMFEM), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the MMFEM may be achieved by implementing a microcontroller such as CAST's R8051XC2 microcontroller; Intel's MCS 51 (i.e., 8051 microcontroller); and/or the like. Also, to implement certain features of the MMFEM, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the MMFEM component collection (distributed or otherwise) and/or features may be implemented via the microprocessor and/or via embedded components; e.g., via ASIC, coprocessor, DSP, FPGA, and/or the like. Alternately, some implementations of the MMFEM may be implemented with embedded components that are configured and used to achieve a variety of features or signal processing.

Depending on the particular implementation, the embedded components may include software solutions, hardware solutions, and/or some combination of both hardware/software solutions. For example, MMFEM features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the MMFEM features. A hierarchy of programmable interconnects allow logic blocks to be interconnected as needed by the MMFEM system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the MMFEM may be developed on regular FPGAs and then migrated into a fixed version that more resembles ASIC implementations. Alternate or coordinating implementations may migrate MMFEM controller features to a final ASIC instead of or in addition to FPGAs. Depending on the implementation all of the aforementioned embedded components and microprocessors may be considered the "CPU" and/or "processor" for the MMFEM.

Power Source

The power source 986 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 986 is connected to at least one of the interconnected subsequent components of the MMFEM thereby providing an electric current to all subsequent components. In one example, the power source 986 is connected to the system bus component 904. In an alternative embodiment, an outside power source 986 is provided through a connection across the I/O 908 interface. For example, a USB and/or IEEE 1394 connection carries both data and power across the connection and is therefore a suitable source of power.

Interface Adapters

Interface bus(ses) 907 may accept, connect, and/or communicate to a number of interface adapters, conventionally although not necessarily in the form of adapter cards, such as but not limited to: input output interfaces (I/O) 908, storage interfaces 909, network interfaces 910, and/or the like. Optionally, cryptographic processor interfaces 927 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 909 may accept, communicate, and/or connect to a number of storage devices such as, but not limited to: storage devices 914, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 910 may accept, communicate, and/or connect to a communications network 913. Through a communications network 913, the MMFEM controller is accessible through remote clients 933*b* (e.g., computers with web browsers) by users 933*a*. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., Distributed MMFEM), architectures may similarly be employed to pool, load balance, and/or otherwise decrease/increase the communicative bandwidth required by the MMFEM controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 910 may be used to engage with various communications network types 913. For example, multiple network interfaces may be employed to allow for the communication over broadcast, multicast, and/or unicast networks.

Input Output interfaces (I/O) 908 may accept, communicate, and/or connect to user input devices 911, peripheral devices 912, cryptographic processor devices 928, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 911 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 912 may be connected and/or communicate to I/O and/or other facilities of the like such as network interfaces, storage interfaces, directly to the interface bus, system bus, the CPU, and/or the like. Peripheral devices may be external, internal and/or part of the MMFEM controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the MMFEM controller may be embodied as an embedded, dedicated, and/or monitor-less (i.e., headless) device, wherein access would be provided over a network interface connection.

Cryptographic units such as, but not limited to, microcontrollers, processors 926, interfaces 927, and/or devices 928 may be attached, and/or communicate with the MMFEM controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 929. However, memory is a fungible technology and resource, thus, any number of memory embodiments may be employed in lieu of or in concert with one another. It is to be understood that the MMFEM controller and/or a computer systemization may employ various forms of memory 929. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 929 will include ROM 906, RAM 905, and a storage device 914. A storage device 914 may be any conventional computer system storage. Storage devices may include: an array of devices (e.g., Redundant Array of Independent Disks (RAID)); a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 929 may contain a collection of program and/or database components and/or data such as, but not limited to: operating system component(s) 915 (operating system); information server component(s) 916 (information server); user interface component(s) 917 (user interface); Web browser component(s) 918 (Web browser); database(s) 919; mail server component(s) 921; mail client component(s) 922; cryptographic server component(s) 920 (cryptographic server); the MMFEM component(s) 935; and/or the like (i.e., collectively a component collection). These components may be stored and accessed from the storage devices and/or from storage devices accessible through an interface bus. Although non-conventional program components such as those in the component collection, typically, are stored in a local storage device 914, they may also be loaded and/or stored in memory such as: peripheral devices, RAM, remote storage facilities through a communications network, ROM, various forms of memory, and/or the like.

Operating System

The operating system component 915 is an executable program component facilitating the operation of the MMFEM controller. Typically, the operating system facilitates access of I/O, network interfaces, peripheral devices, storage devices, and/or the like. The operating system may be a highly fault tolerant, scalable, and secure system such as: Apple's Macintosh OS X (Server); AT&T Plan 9; Be OS; Google's Chrome; Microsoft's Windows 7/8; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/Mobile/NT/Vista/XP (Server), Palm OS, and/or the like. Additionally, for robust mobile deployment applications, mobile operating systems may be used, such as: Apple's iOS; China Operating System COS; Google's Android; Microsoft Windows RT/Phone; Palm's WebOS; Samsung/Intel's Tizen; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the MMFEM controller to communicate with other entities through a communications network 913. Various communication protocols may be used by the MMFEM controller as a subcarrier transport mechanism for interaction, such as, but not limited to: multicast, TCP/IP, UDP, unicast, and/or the like.

Information Server

An information server component 916 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the MMFEM controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the MMFEM database 919, operating systems, other program components, user interfaces, Web browsers, and/or the like.

Access to the MMFEM database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the MMFEM. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the MMFEM as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple's iOS, Macintosh Operating System's Aqua; IBM's OS/2; Google's Chrome; Microsoft's Windows varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo User Interface, any of which may be used and) provide a baseline and means of accessing and displaying information graphically to users.

A user interface component 917 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 918 is a stored program component that is executed by a CPU. The Web browser may be a conventional hypertext viewing application such as Apple's (mobile) Safari, Google's Chrome, Microsoft Internet Explorer, Mozilla's Firefox, Netscape Navigator, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the MMFEM enabled nodes. The combined application may be nugatory on systems employing standard Web browsers.

Mail Server

A mail server component 921 is a stored program component that is executed by a CPU 903. The mail server may be a conventional Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the MMFEM.

Access to the MMFEM mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 922 is a stored program component that is executed by a CPU 903. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 920 is a stored program component that is executed by a CPU 903, cryptographic processor 926, cryptographic processor interface 927, cryptographic processor device 928, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the MMFEM may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the MMFEM component to engage in secure transactions if so desired. The cryptographic component facilitates the secure accessing of resources on the MMFEM and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The MMFEM Database

The MMFEM database component 919 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the MMFEM database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the MMFEM database is implemented as a data-structure, the use of the MMFEM database 919 may be integrated into another component such as the MMFEM component 935. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 919 includes several tables 919a-z:

An accounts table 919a includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 919b includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a MMFEM);

An devices table 919c includes fields such as, but not limited to: deviceID, accountID, assetIDs, paymentIDs, deviceType, deviceName, deviceModel, deviceVersion, deviceSerialNo, deviceIPaddress, deviceMACaddress, device_ECID, deviceUUID, deviceLocation, deviceCertificate, deviceOS, appIDs, deviceResources, deviceSession, authKey, deviceSecureKey, walletAppinstalledFlag, deviceAccessPrivileges, device Preferences, deviceRestrictions, and/or the like;

An apps table 919d includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions, portNum, access_API_call, linked_wallets_list, and/or the like;

An assets table 919e includes fields such as, but not limited to: assetID, accountID, userID, distributorAccountID, distributorPaymentID, distributorOnwerID, assetType, assetName, assetCode, assetQuantity, assetCost, assetPrice, assetManufactuer, assetModelNo, assetSerialNo, assetLocation, assetAddress, assetState, assetZIPcode, assetState, assetCountry, assetEmail, assetIPaddress, assetURLaccessCode, assetOwnerAccountID, subscriptionIDs, assetAuthroizationCode, assetAccessPrivileges, assetPreferences, assetRestrictions, and/or the like;

A payments table 919f includes fields such as, but not limited to: paymentID, accountID, userID, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table 919g includes fields such as, but not limited to: transactionID, accountID, assetIDs, deviceIDs, paymentIDs, transactionIDs, userID, transactionType, transactionDate, transactionAmount, transactionQuantity, transactionDetails, transactionNo, transactionAccessPrivileges, transactionPreferences, transactionRestrictions, and/or the like;

An merchants table 919h includes fields such as, but not limited to: merchantID, merchantTaxID, merchanteName, merchantContactUserID, accountID, issuerID, acquirerID, merchantEmail, merchantAddress, merchantState, merchantZIPcode, merchantCountry, merchantAuthKey, merchantIPaddress, portNum, merchantURLaccessCode, merchantPortNo, merchantAccessPrivileges, merchantPreferences, merchantRestrictions, and/or the like;

A Batches table 919i may include fields such as, but not limited to: batch_id, basket_ID, finan_instrum_ID, funds_ID, transaction_id_list, timestamp_list, cleared_flag_list, clearance_trigger_settings, and/or the like;

A Baskets table 919j may include fields such as, but not limited to: basket_ID, finan_instrum_ID, funds_ID, basket_title, basket_attributes_list, basket_size, basket_participants_list, basket_price, related_baskets_list, basket_funds_list, and/or the like;

A Financial Instruments table 919k may include fields such as, but not limited to: finan_instrum_ID, assetID, accountID, userID, basket_ID, funds_ID, financial_instruments_title, finan_instrum_attributes_list, finan_instrum_price, related_finan_instrum_list, finan_instrum_funds_list, and/or the like;

A Funds table 919l may include fields such as, but not limited to: funds_ID, assetID, accountID, userID, finan_instrum_ID, basket_ID, funds_title, funds_attributes_list, funds_size, funds_price, related_funds_list, funds_basket_list, and/or the like;

An Issuers table 919m may include fields such as, but not limited to: issuer_id, issuer_name, issuer_address, ip_address, mac_address, auth_key, port_num, security_settings_list, and/or the like;

An Acquirers table 919n may include fields such as, but not limited to: account_firstname, account_lastname, account_type, account_num, account_balance_list, billingaddress_line1, billingaddress_line2, billing_zipcode, billing_state, shipping_preferences, shippingaddress_line1, shippingaddress_line2, shipping_zip code, shipping_state, and/or the like; and A market_data table 919z includes fields such as, but not limited to: market_data_feed_ID, asset_ID, asset_symbol, asset_name, spot_price, bid_price, ask_price, and/or the like; in one embodiment, the market data table is populated through a market data feed (e.g., Bloomberg's PhatPipe, Dun & Bradstreet, Reuter's Tib, Triarch, etc.), for example, through Microsoft's Active Template Library and Dealing Object Technology's real-time toolkit Rtt.Multi.

In one embodiment, the MMFEM database may interact with other database systems. For example, employing a distributed database system, queries and data access by search MMFEM component may treat the combination of the MMFEM database, an integrated data security layer database as a single database entity.

In one embodiment, user programs may contain various user interface primitives, which may serve to update the MMFEM. Also, various accounts may require custom database tables depending upon the environments and the types of clients the MMFEM may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 919a-z. The MMFEM may be configured to keep track of various settings, inputs, and parameters via database controllers.

The MMFEM database may communicate to and/or with other components in a component collection, including itself, and/or facilities of the like. Most frequently, the MMFEM database communicates with the MMFEM component, other program components, and/or the like. The database may contain, retain, and provide information regarding other nodes and data.

The MMFEMs

The MMFEM component 935 is a stored program component that is executed by a CPU. In one embodiment, the MMFEM component incorporates any and/or all combinations of the aspects of the MMFEM that was discussed in the previous figures. As such, the MMFEM affects accessing, obtaining and the provision of information, services, transactions, and/or the like across various communications networks. The features and embodiments of the MMFEM discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the MMFEM's features and facilities, and in many cases reduce the costs, energy consumption/requirements, and extend the life of MMFEM's underlying infrastructure; this has the added benefit of making the MMFEM more reliable. Similarly, many of the features and mechanisms are designed to be easier for users to use and access, thereby broadening the audience that may enjoy/employ and exploit the feature sets of the MMFEM; such ease of use also helps to increase the reliability of the MMFEM. In addition, the feature sets include heightened security as noted via the Cryptographic components 920, 926, 928 and throughout, making access to the features and data more reliable and secure The MMFEM transforms user share purchase, redemption request inputs, via MMFEM components (e.g., Basket Creation, Basket Redemption, Share issuance, NAV Calculation, Share Calculation, Order Execution, CTF Structure Initiation, Pricing Discovery, Tighten Spread, Master-Feeder, etc.), into fund share transaction records outputs.

The MMFEM component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo User Interface; and/or the like), WebObjects, and/or the like. In one embodiment, the MMFEM server employs a cryptographic server to encrypt and decrypt communications. The MMFEM component may communicate to and/or with other components in a component collection, including itself, and/or facilities of the like. Most frequently, the MMFEM component communicates with the MMFEM database, operating systems, other program components, and/or the like. The MMFEM may contain, communicate, generate, obtain, and/or provide program component, system, user, and/or data communications, requests, and/or responses.

Distributed MMFEMs

The structure and/or operation of any of the MMFEM node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the MMFEM controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:
w3c-post http:// . . . Value1
where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the MMFEM controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
//set ip address and port to listen to for incoming data
    $address='192.168.0.100';
    $port=255;
//create a server-side SSL socket, listen for/accept incoming communication $sock=socket_create(AF_INET,
    SOCK_STREAM, 0);
socket_bind($sock, $address, $port) or die('Could not
    bind to address');
socket_listen($sock);
$client=socket_accept($sock);
//read input data from client device in 1024 byte blocks
    until end of message do {
    $input=" ";
    $input=socket_read($client, 1024);
    $data.=$input;
}while($input !=" ");
//parse data to extract variables
$obj=json_decode($data, true);
//store input data in a database
mysql_connect("201.408.185.132",$DBserver,$pass-
    word); //access database server
mysql_select("CLIENT_DB.SQL"); //select database to
    append
```

```
mysgl_query("INSERT INTO UserTable (transmission)
    VALUES ($data)"); //add data to UserTable table in a
    CLIENT database
mysql_close("CLIENT_DB.SQL"); //close connection to
    database
?>
```

Also, the following resources may be used to provide example embodiments regarding SOAP parser implementation:

http://www.xay.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

Additional example embodiments of the MMFEM include:

1. A computer-implemented method for operating a master trust that holds a portfolio of assets for plural feeder funds including at least a mutual fund and an exchange traded fund (ETF), the method comprising:
   receiving, by one or more computers, a transfer of a pre-determined group of securities or cash along with purchase requests for ETF class master shares from an exchange traded fund, the securities for deposit into a master pool of assets that holds the portfolio for the mutual fund and the exchange traded fund;
   calculating, by the one or more computers, a number of ETF class master shares in the master to exchange for the received pre-determined group of securities;
   causing transfer of the first number of ETF class master shares to the exchange traded fund for the received pre-determined group of financial assets;
   receiving, by the one or more computers, a transfer of a group of securities or cash along with purchase requests for mutual fund class master shares, from a mutual fund, the securities for deposit in the master pool of assets that holds the portfolio of the mutual fund and the exchange traded fund;
   calculating, by the one or more computers, a number of mutual fund class master shares in the master to exchange for the received securities; and
   causing a transfer of the number of mutual fund class master shares to the mutual fund for the received securities from the mutual fund.

2. The method of embodiment 1, wherein the master pool further holds assets for a commingled pool, the method further comprising:
   receiving, by the one or more computers, a transfer of a pre-determined group of securities or cash along with purchase requests for commingled pool class master shares from a commingled pool, the securities for deposit in the master pool of assets that holds the portfolio for the mutual fund, the exchange traded fund and the commingled pool;
   calculating, by the one or more computers, a number of commingled pool class master shares to exchange for the received pre-determined group of securities; and
   causing a transfer of the number of commingled pool class master shares to the commingled pool for the received pre-determined group of securities.

3. The method of embodiment 1, wherein the one or more computer systems each comprise:
   at least a processor and a memory coupled to the processor, configured to:
   manage transactions between the master and each of the mutual fund and exchange traded fund;
   determine a net asset valuation of master shares; and
   perform share creation and redemption processing.

4. The method of embodiment 1, wherein determining net asset value of master shares comprises:

$$NAV_M = (V + C - L)/S_M$$

where:
$NAV_M$ is the net asset value of a master share
V is the total value of securities in the investment pool
C is cash on hand (and other assets)
L liabilities (expenses, fees)
$S_M$ total number of outstanding shares in the master.

5. The method of embodiment 1, wherein performing share creation processing further comprises:
   determining for creation requests received from ETF a number of creation units worth of securities received; and
   dividing number of creation units received by a share factor 6. The method of embodiment 5, the share factor is a ratio of a number of master shares to a creation unit.

7. The method of embodiment 1, calculating the number of mutual fund class master shares further comprises:
   determining the number of mutual fund class master shares to transfer to the mutual fund by dividing the value of the pre-determined group of securities received from the mutual fund by a net asset value of a mutual fund class master share.

8. The method of embodiment 1, calculating the number of commingled class master shares further comprises:
   determining the number of commingled class master shares to transfer to the commingled pool by dividing the value of the predetermined group of securities received from the commingled pool by a net asset value of a commingled class master share.

9. The method of embodiment 1, wherein determining net asset value of master shares are determined according to master share class.

10. The method of embodiment 1 wherein determining net asset value of master shares are determined according to master share class according to:

$$NAV_M = (V + C - L)/S_M$$

where:
$NAV_M$ is the net asset value of a master share
V is the total value of securities in the investment pool
C is cash on hand (and other assets)
L liabilities (expenses, fees)
$S_M$ total number of outstanding shares in the master, and
wherein the value of L is Letf that reflects expenses/costs attributed to the ETF feeder for calculating the NAV of the ETF class, the value of L is Lmf that reflects expenses/costs attributed to the mutual fund feeder for calculating the NAV of the mutual fund class, and the value of L is Lcp that reflects expenses/costs attributed to the commingled feeder for calculating the NAV of the ETF class.

11. A computer-implemented method for managing a master trust that holds a portfolio of assets for at least one of a registered investment company and unregistered investment company, and holds a portfolio of assets for an exchange traded fund (ETF), the method comprising:

receiving, by one or more computers, a transfer of a pre-determined group of securities along with purchase requests for ETF class master shares from an exchange traded fund, the securities for deposit into a master pool of assets that holds the portfolio for the at least one registered investment company and unregistered investment company, and the exchange traded fund;

calculating, by the one or more computers, a number of ETF class master shares in the master to exchange for the received pre-determined group of securities;

causing transfer of the first number of ETF class master shares to the exchange traded fund for the received pre-determined group of financial assets;

receiving, by the one or more computers, a transfer of a group of securities along with purchase requests for the at least one registered investment company and unregistered investment company class master shares, the securities for deposit in the master pool of assets;

calculating, by the one or more computers, a number of the at least one registered investment company and unregistered investment company class master shares to exchange for the received securities; and causing a transfer of the number of the at least one registered investment company and unregistered investment company class master shares to the at least one registered investment company and unregistered investment company for the received securities.

12. The method of embodiment 10, wherein the at least one of registered investment company and unregistered investment company, is a registered investment company that is a mutual fund.

13. The method of embodiment 10, wherein the at least one of registered investment company and unregistered investment company, is an unregistered investment company that is a commingled fund.

14. The method of embodiment 10, wherein determining net asset value of master shares comprises:

$$NAV_M = (V+C-L)/S_M$$

where:
$NAV_M$ is the net asset value of a master share
V is the total value of securities in the investment pool
C is cash on hand (and other assets)
L liabilities (expenses, fees)
$S_M$ total number of outstanding shares in the master.

15. The method of embodiment 10, further comprising performing share creation by determining for creation requests received from ETF a number of creation units worth of securities received; and dividing number of creation units received by a share factor.

16. The method of embodiment 14, the share factor is a ratio of a number of master shares to a creation unit.

17. A computer program product tangible stored on a computer readable storage device for managing a master trust that holds a portfolio of assets for plural feeder funds including at least a mutual fund and an exchange traded fund (ETF), the product comprising instructions to cause a processor to:

receive a transfer of a pre-determined group of securities or cash along with purchase requests for ETF class master shares from an exchange traded fund, the securities for deposit into a master pool of assets that holds the portfolio for the mutual fund and the exchange traded fund;

calculate a number of ETF class master shares in the master to exchange for the received pre-determined group of securities;

cause transfer of the first number of ETF class master shares to the exchange traded fund for the received pre-determined group of financial assets;

receive a transfer of a group of securities or cash along with purchase requests for mutual fund class master shares, from a mutual fund, the securities for deposit in the master pool of assets that holds the portfolio of the mutual fund and the exchange traded fund;

calculate a number of mutual fund class master shares in the master to exchange for the received securities; and cause a transfer of the number of mutual fund class master shares to the mutual fund for the received securities from the mutual fund.

18. An apparatus, comprising:
a processing device;
memory; and
a computer program product tangible stored on a computer readable storage device for managing a master trust that holds a portfolio of assets for plural feeder funds including at least a mutual fund and an exchange traded fund (ETF), the product comprising instructions to cause a processor to:

receive a transfer of a pre-determined group of securities or cash along with purchase requests for ETF class master shares from an exchange traded fund, the securities for deposit into a master pool of assets that holds the portfolio for the mutual fund and the exchange traded fund;

calculate a number of ETF class master shares in the master to exchange for the received pre-determined group of securities;

cause transfer of the first number of ETF class master shares to the exchange traded fund for the received pre-determined group of financial assets;

receive a transfer of a group of securities or cash along with purchase requests for mutual fund class master shares, from a mutual fund, the securities for deposit in the master pool of assets that holds the portfolio of the mutual fund and the exchange traded fund;

calculate a number of mutual fund class master shares in the master to exchange for the received securities; and cause a transfer of the number of mutual fund class master shares to the mutual fund for the received securities from the mutual fund.

In order to address various issues and advance the art, the entirety of this application for Multichannel Master Feeder Exchange Mechanism Apparatuses, Methods and Systems (including the Cover Page, Tide, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower," "upper," "horizontal," "vertical," "above," "below," "up," "down," "top" and "bottom" as well as derivative thereof (e.g., "horizontally," "downwardly," "upwardly," etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached," "affixed," "connected," "coupled," "interconnected," and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a MMFEM individual and/or enterprise user, database configuration and/or relational model, data type, data transmission and/or network framework, syntax structure, and/or the like, various embodiments of the MMFEM, may be implemented that enable a great deal of flexibility and customization. For example, aspects of the MMFEM may be adapted for asset data structure packaging and transport. While various embodiments and discussions of the MMFEM have included data structures and information management asset management, however, it is to be understood that the embodiments described herein may be readily configured and/or customized for a wide variety of other applications and/or implementations.

What is claimed is:

1. A processor-implemented multichannel fund feeding data passage structure apparatus, comprising:
   a memory;
   a component collection in the memory, including:
      a processor-implemented master multichannel fund data repository structure component, having master transfer agent, and master fund structure objective subcomponents;
      a processor-implemented mutual fund data passage structure component, having mutual transfer agent, and mutual fund structure objective subcomponents;
      a processor-implemented ETF data passage structure component, having, ETF transfer agent, ETF fund structure objective subcomponents;
   a processor disposed in communication with the memory, and configured to issue a plurality of processing instructions from the component collection stored in the memory,
      wherein the processor issues instructions from the mutual fund data passage structure component, stored in the memory, to:
         obtain a cash contribution data message from retail investor at a mutual fund feeder account,
         determine aggregation of the cash contribution data messages;
         determine issue shares and generate issue share identifiers for the determined issue shares of the mutual fund data passage structure's account per the determined aggregation of cash contribution data messages;
         transfer, via mutual transfer agent, assets datastructure references from the cash contribution data message to accounts referenced by the mutual fund data passage structure component;
         procure equitized assets datastructure account references, via processor, with the transferred asset datastructure references from the cash contribution data message, per the mutual fund structure objective subcomponent, wherein procurement may be arranged by a portfolio manager agent;
         determine a creation unit of value for a master multichannel fund repository datastructure, based on the procured equitized assets datastructure account references;
         provide a securities-in-kind message with the creation unit of value via the master multichannel fund repository datastructure to the master multichannel fund data repository component;
         obtain master multichannel fund share message in return for the securities-in-kind message, having asset value allocations and references for exchange of the securities-in-kind message values;
      wherein the processor issues instructions from the master multichannel fund data repository structure component, stored in the memory, to:
         obtain the securities-in-kind message from the mutual fund data passage structure component;
         determine, continuously via processor, an asset value allocation of the master multichannel fund repository datastructure in exchange for asset value references in the securities-in-kind message;

issue a master multichannel fund share message having an asset share allocation from the determined asset value allocation;

provide the issued master multichannel fund share message to the mutual fund data passage structure component;

wherein the processor issues instructions from the ETF data passage structure component, stored in the memory, to:

provide a ETF securities-in-kind message with an ETF creation unit of value via the master multichannel fund repository datastructure to the master multichannel fund data repository component; and obtain an ETF master multichannel fund share message in return for the ETF securities-in-kind message, having asset value allocations and references for exchange of the ETF securities-in-kind message values.

2. The apparatus of claim 1, wherein determination and provision of equitized assets account references via securities-in-kind messages may occur on demand, dynamically, continuously, and periodically, including by minute, hour, day, week, month and year.

3. The apparatus of claim 1, wherein ETF data passage structure component provides a portfolio composition file and include a desired list of securities and weights, and a value of a total creation basket.

4. The apparatus of claim 1, further, comprising:

wherein the processor issues instructions from the mutual fund data passage structure component, stored in the memory, to:

obtain a portfolio composition file (PCF) and include a desired list of securities and weights, and a value of a total creation basket;

determine a value of securities accumulated in the mutual fund data passage structure based on the PCF.

5. A processor-readable non-transient multichannel fund feeding data passage structure medium storing processor-executable components, the components, comprising:

a component collection in the medium, including:

a processor-implemented master multichannel fund data repository structure component, having master transfer agent, and master fund structure objective subcomponents;

a processor-implemented mutual fund data passage structure component, having mutual transfer agent, and mutual fund structure objective subcomponents;

a processor-implemented ETF data passage structure component, having, ETF transfer agent, ETF fund structure objective subcomponents;

wherein the mutual fund data passage structure component, stored in the medium, includes processor-issuable instructions to:

obtain a cash contribution data message from retail investor at a mutual fund feeder account, determine aggregation of the cash contribution data messages;

determine issue shares and generate issue share identifiers for the determined issue shares of the mutual fund data passage structure's account per the determined aggregation of cash contribution data messages;

transfer, via mutual transfer agent, assets datastructure references from the cash contribution data message to accounts referenced by the mutual fund data passage structure component;

procure equitized assets datastructure account references, via processor, with the transferred asset datastructure references from the cash contribution data message, per the mutual fund structure objective subcomponent, wherein procurement may be arranged by a portfolio manager agent;

determine a creation unit of value for a master multichannel fund repository datastructure, based on the procured equitized assets datastructure account references;

provide a securities-in-kind message with the creation unit of value via the master multichannel fund repository datastructure to the master multichannel fund data repository component; and obtain master multichannel fund share message in return for the securities-in-kind message, having asset value allocations and references for exchange of the securities-in-kind message values;

wherein the master multichannel fund data repository structure component, stored in the medium, includes processor-issuable instructions to:

obtain the securities-in-kind message from the mutual fund data passage structure component;

determine, continuously via processor, an asset value allocation of the master multichannel fund repository datastructure in exchange for asset value references in the securities-in-kind message;

issue a master multichannel fund share message having an asset share allocation from the determined asset value allocation;

provide the issued master multichannel fund share message to the mutual fund data passage structure component;

wherein the ETF data passage structure component, stored in the medium, includes processor-issuable instructions to:

provide a ETF securities-in-kind message with an ETF creation unit of value via the master multichannel fund repository datastructure to the master multichannel fund data repository component; and obtain an ETF master multichannel fund share message in return for the ETF securities-in-kind message, having asset value allocations and references for exchange of the ETF securities-in-kind message values.

6. The medium of claim 5, wherein determination and provision of equitized assets account references via securities-in-kind messages may occur on demand, dynamically, continuously, and periodically, including by minute, hour, day, week, month and year.

7. The medium of claim 5, wherein ETF data passage structure component provides a portfolio composition file and include a desired list of securities and weights, and a value of a total creation basket.

8. The medium of claim 5, further, comprising:

wherein the processor issues instructions from the mutual fund data passage structure component, stored in the medium, to:

obtain a portfolio composition file (PCF) and include a desired list of securities and weights, and a value of a total creation basket;

determine a value of securities accumulated in the mutual fund data passage structure based on the PCF.

9. A processor-implemented multichannel fund feeding data passage structure system, comprising:
   a mutual fund data passage structure component means, to:
      obtain a cash contribution data message from retail investor at a mutual fund feeder account,
      determine aggregation of the cash contribution data messages;
      determine issue shares and generate issue share identifiers for the determined issue shares of the mutual fund data passage structure's account per the determined aggregation of cash contribution data messages;
      transfer, via mutual transfer agent, assets datastructure references from the cash contribution data message to accounts referenced by the mutual fund data passage structure component;
      procure equitized assets datastructure account references, via processor, with the transferred asset datastructure references from the cash contribution data message, per the mutual fund structure objective subcomponent, wherein procurement may be arranged by a portfolio manager agent;
      determine a creation unit of value for a master multichannel fund repository datastructure, based on the procured equitized assets datastructure account references;
      provide a securities-in-kind message with the creation unit of value via the master multichannel fund repository datastructure to the master multichannel fund data repository component;
      obtain master multichannel fund share message in return for the securities-in-kind message, having asset value allocations and references for exchange of the securities-in-kind message values;
   a master multichannel fund data repository structure component means, to:
      obtain the securities-in-kind message from the mutual fund data passage structure component;
      determine, continuously via processor, an asset value allocation of the master multichannel fund repository datastructure in exchange for asset value references in the securities-in-kind message;
      issue a master multichannel fund share message having an asset share allocation from the determined asset value allocation;
      provide the issued master multichannel fund share message to the mutual fund data passage structure component;
   a ETF data passage structure component means, to:
      provide a ETF securities-in-kind message with an ETF creation unit of value via the master multichannel fund repository datastructure to the master multichannel fund data repository component; and
      obtain an ETF master multichannel fund share message in return for the ETF securities-in-kind message, having asset value allocations and references for exchange of the ETF securities-in-kind message values.

10. The system of claim 9, wherein determination and provision of equitized assets account references via securities-in-kind messages may occur on demand, dynamically, continuously, and periodically, including by minute, hour, day, week, month and year.

11. The system of claim 9, wherein ETF data passage structure component provides a portfolio composition file and include a desired list of securities and weights, and a value of a total creation basket.

12. The system of claim 9, further, comprising:
   wherein the processor issues instructions from the mutual fund data passage structure component, stored in the memory, to:
      obtain a portfolio composition file (PCF) and include a desired list of securities and weights, and a value of a total creation basket;
      determine a value of securities accumulated in the mutual fund data passage structure based on the PCF.

13. A processor-implemented multichannel fund feeding data passage structure method, comprising:
   a mutual fund data passage structure component means, to executing processor-implemented mutual fund data passage structure component instructions to:
      obtain a cash contribution data message from retail investor at a mutual fund feeder account,
      determine aggregation of the cash contribution data messages;
      determine issue shares and generate issue share identifiers for the determined issue shares of the mutual fund data passage structure's account per the determined aggregation of cash contribution data messages;
      transfer, via mutual transfer agent, assets datastructure references from the cash contribution data message to accounts referenced by the mutual fund data passage structure component;
      procure equitized assets datastructure account references, via processor, with the transferred asset references from the cash contribution data message, per the mutual fund structure objective subcomponent, wherein procurement may be arranged by a portfolio manager agent;
      determine creation unit of value for a master multichannel fund repository datastructure, based on the procured equitized assets datastructure account references;
      provide a securities-in-kind message with the creation unit of value via the master multichannel fund repository datastructure to the master multichannel fund data repository component;
      obtain master multichannel fund share message in return for the securities-in-kind message, having asset value allocations and references for exchange of the securities-in-kind message values;
   executing processor-implemented master multichannel fund data repository structure component instructions to:
      obtain the securities-in-kind message from the mutual fund data passage structure component;
      determine, continuously via processor, an asset value allocation of the master multichannel fund repository datastructure in exchange for asset value references in the securities-in-kind message;
      issue a master multichannel fund share message having an asset share allocation from the determined asset value allocation;
      provide the issued master multichannel fund share message to the mutual fund data passage structure component;
   executing processor-implemented ETF data passage structure component instructions to:
      provide a ETF securities-in-kind message with an ETF creation unit of value via the master multichannel fund repository datastructure to the master multichannel fund data repository component; and obtain an ETF master multichannel fund share message in return for the ETF securities-in-kind message, having asset value allocations and references for exchange of the ETF securities-in-kind message values.

14. The method of claim 13, wherein determination and provision of equitized assets account references via securities-in-kind messages may occur on demand, dynamically, continuously, and periodically, including by minute, hour, day, week, month and year.

15. The method of claim 13, wherein ETF data passage structure component provides a portfolio composition file and include a desired list of securities and weights, and a value of a total creation basket.

16. The method of claim 13, further, comprising:
wherein the processor issues instructions from the mutual fund data passage structure component, stored in the memory, to:
  obtain a portfolio composition file (PCF) and include a desired list of securities and weights, and a value of a total creation basket;
  determine a value of securities accumulated in the mutual fund data passage structure based on the PCF.

17. A processor-implemented non-transparent, master-feeder investment vehicle management, multichannel data structure apparatus, comprising:
a processor; and
a memory disposed in communication with the processor and storing processor-issuable instructions to:
instantiate a datapath of a pre-determined group of securities along with purchase requests for ETF class master shares from an exchange traded fund, the datapath including a data feed for securities for deposit into a master pool of assets that holds the portfolio for the mutual fund and the exchange traded fund;
facilitating a transaction of ETF class master share data structures in the master to exchange for the received pre-determined group of securities;
causing transfer of the first number of ETF class master shares to the exchange traded fund for the received pre-determined group of financial assets;
receiving a datafeed of a group of securities along with purchase requests for mutual fund class master shares, from a mutual fund, the datapath including a datafeed of securities for deposit in the master pool of assets that holds the portfolio of the mutual fund and the exchange traded fund;
calculating a number of mutual fund class master shares in the master to exchange for the received securities; and
causing a transfer of the number of mutual fund class master shares to the mutual fund for the received securities from the mutual fund.

18. The processor-implemented non-transparent, master-feeder investment vehicle management, multichannel data structure apparatus, of claim 17 wherein a datafeed of the master pool further holds assets for a commingled pool, the apparatus further configured to:
receive a data transfer of a pre-determined group of securities or cash along with purchase requests for commingled pool class master shares from a commingled pool, the securities for deposit in the master pool of assets that holds the portfolio for the mutual fund, the exchange traded fund and the commingled pool;
calculate, via said processor, a number of commingled pool class master shares to exchange for the received pre-determined group of securities; and
cause a transfer of the number of commingled pool class master shares to the commingled pool for the received pre-determined group of securities.

* * * * *